US011882435B2

(12) United States Patent
Guo et al.

(10) Patent No.: US 11,882,435 B2
(45) Date of Patent: Jan. 23, 2024

(54) MBS-KEY DISTRIBUTION AND TRAFFIC PROTECTION

(71) Applicant: APPLE INC., Cupertino, CA (US)

(72) Inventors: Shu Guo, Beijing (CN); Dawei Zhang, Cupertino, CA (US); Fangli Xu, Beijing (CN); Haijing Hu, Cupertino, CA (US); Huarui Liang, Beijing (CN); Sudeep Manithara Vamanan, Bavaria-Bayern (DE); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 254 days.

(21) Appl. No.: 17/593,506

(22) PCT Filed: Oct. 29, 2020

(86) PCT No.: PCT/CN2020/124922
§ 371 (c)(1),
(2) Date: Sep. 20, 2021

(87) PCT Pub. No.: WO2022/087979
PCT Pub. Date: May 5, 2022

(65) Prior Publication Data
US 2022/0312196 A1    Sep. 29, 2022

(51) Int. Cl.
*H04W 12/037* (2021.01)
*H04W 12/041* (2021.01)
(Continued)

(52) U.S. Cl.
CPC ......... *H04W 12/037* (2021.01); *H04L 9/0825* (2013.01); *H04L 9/14* (2013.01); *H04W 4/08* (2013.01); *H04W 12/041* (2021.01)

(58) Field of Classification Search
CPC ... H04W 12/037; H04W 12/041; H04W 4/06; H04W 4/08; H04L 9/0825; H04L 9/14
See application file for complete search history.

(56) References Cited

U.S. PATENT DOCUMENTS

2005/0026607 A1    2/2005  Hwang et al.
2015/0119023 A1*   4/2015  Wang .................... H04L 12/189
                                                              455/432.1
(Continued)

FOREIGN PATENT DOCUMENTS

CN    102404691 A   *  4/2012
CN    111406415 A      7/2020
(Continued)

OTHER PUBLICATIONS

3GPP. TS 33.246 V16.0.0, "Security of Multimedia Broadcast/Multicast Service (MBMS) (Release 16)", Jul. 2020. (Year: 2020).*
(Continued)

*Primary Examiner* — Michael Simitoski
(74) *Attorney, Agent, or Firm* — Dorsey & Whitney LLP

(57) ABSTRACT

MBS key distribution includes processing group information associated with an MB session context received from an AF. At least a portion of the group information comprises a TMGI. A plurality of session join requests received from a plurality of UEs are processed. Each of the plurality of session join requests include the TMGE and are associated with the MB session context. A request associated with the MB session context for transmission to an MB-SMF is encoded. A response associated with the MB session context received from the MB-SMF is processed. The response includes a key derived for each of a portion of the plurality of UEs using a UE ID and the TMGI. A DL NAS message and an N2 message are encoded for the plurality of UEs and a base station, respectively. The DL NAS message and the N2 message include the derived key.

19 Claims, 15 Drawing Sheets

(51) Int. Cl.
*H04L 9/08* (2006.01)
*H04L 9/14* (2006.01)
*H04W 4/08* (2009.01)

(56) References Cited

U.S. PATENT DOCUMENTS

| | | | | |
|---|---|---|---|---|
| 2018/0146362 | A1* | 5/2018 | Hou | H04W 72/30 |
| 2021/0105196 | A1* | 4/2021 | Dao | H04L 43/026 |
| 2022/0053455 | A1* | 2/2022 | Baek | H04W 4/08 |
| 2023/0086661 | A1* | 3/2023 | Rönneke | H04L 65/611 |
| 2023/0209446 | A1* | 6/2023 | Kim | H04W 4/06 |
| | | | | 370/329 |

FOREIGN PATENT DOCUMENTS

| | | | | |
|---|---|---|---|---|
| CN | 115669024 A | * | 1/2023 | H04W 36/0007 |
| WO | WO-2022027476 A1 | * | 2/2022 | H04L 9/0819 |
| WO | WO-2022027686 A1 | * | 2/2022 | |
| WO | WO-2022090435 A1 | * | 5/2022 | |

OTHER PUBLICATIONS

3GPP. TR 33.850 V0.3.0. "Study on Security Aspects of Enhancements for 5G Multicast-Broadcast Services (MBS) (Release 17)", Nov. 2020. (Year: 2020).*

3GPP. TSG-SA3 Meeting #101-e S3-202985, "Key Update Requirement and Solution", Nov. 9-20, 2020. (Year: 2020).*

3GPP. TSG-SA3 Meeting #101-e S3-203424, "Update solution#3 in TR 33.850", Nov. 9-20, 2020. (Year: 2020).*

3GPP. TSG-SA3 Meeting #101-e S3-203423, "New solution for key issue#1 in TR 33.850", Nov. 9-20, 2020. (Year: 2020).*

Deng, Juan et al. "WO 2022/027686 A1" (machine translation), filed Aug. 2020. (Year: 2020).*

Liang, Shuang et al. "CN 115669024 A" (machine translation), filed May 2020. (Year: 2020).*

Guo, Liang et al. "CN 102404691 A" (machine translation), filed Oct. 2008. (Year: 2008).*

Guo, Longhua et al. "WO 2022/027476 A1" (machine translation), filed Aug. 2020. (Year: 2020).*

3GPP TE 33.850 , "3rd Generation Partnership Project; Technical Specification Group Services and System Aspects; Study on Security Aspects of Enhancements for 5G Multicast-Broadcast Services (Release 17)", V0.1.0, Aug. 2020, 12 pages.

Huawei, Hisilicon , "Editorial change to key issue 2", S3-202476, 3GPP TSG-SA3 Meeting #100-bis-e, e-meeting, Agenda Item 2.11, Oct. 12-16, 2020, 2 pages.

Juniper Networks, BBC , "Alignment on the use of terminologies for delivery methods", S2-2004162, SA WG2 Meeting #S2-139e, Agenda Item 8.9, Jun. 1-12, 2020, 23 pages.

PCT/CN2020/124922 , International Search Report and Written Opinion, dated Jul. 27, 2021, 10 pages.

* cited by examiner

MBS-KEY DISTRIBUTION AND TRAFFIC PROTECTION

TECHNICAL FIELD

This application relates generally to wireless communication systems, including key distribution and traffic protection.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
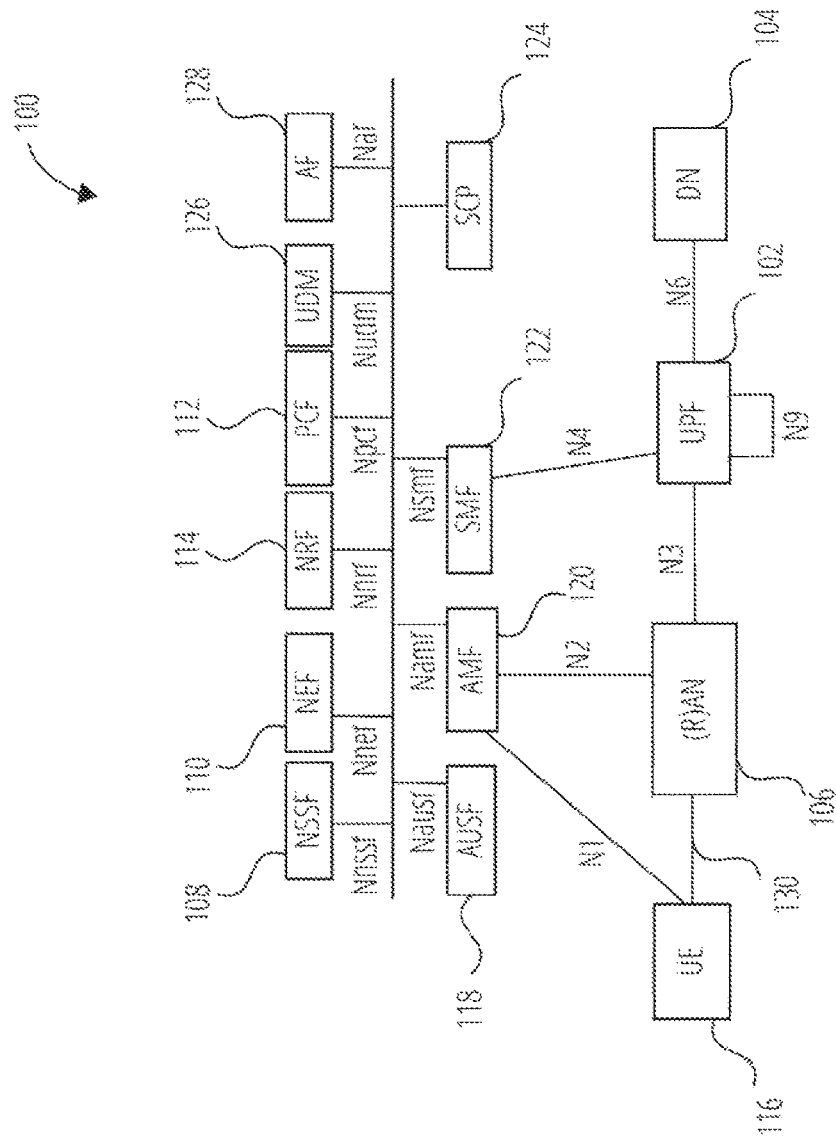
FIG. 1 illustrates an example service-based architecture in accordance with certain embodiments.

With respect to prior and current security requirements associated with wireless networks, SA WG3 (SA3) specification technical report (TR) 33.850 includes a number of key issues. For instance, an issue referred to as key issue #2, provides that 5GS is to support confidentiality protection, integrity protection, and anti-replay protection of multicast/broadcast services (MBS) traffic. In another example, an issue referred to as key issue #3, provides that key distribution and NIBS traffic are to be protected.

Similarly, in the SA2 specification TR 23.757, an issue referred to as key issue #3, addresses authorization for multicast communication services for 5G, which includes the following security-related issues: 1. Define and study how to support the necessary level(s) authorization for UEs to access multicast communication services; and 2. How a UE can join/leave (including authorized or revoked access) a multicast communication service.

This disclosure provides various ways in which keys can be distributed securely to protect MBS traffic. In particular, the service stream has to be encrypted when delivered to the UEs. Initially, however, example system architectures related to the principles described herein are first discussed with respect to FIG. 1, FIG. 2, FIG. 3, and FIG. 4.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

FIG. 1 illustrates a service based architecture 100 in 5GS according to one embodiment. As described in 3GPP TS 23.501, the service based architecture 100 comprises NFs such as an NSSF 108, a NEF 110, an NRF 114, a PCF 112, a UDM 126, an AUSF 118, an AMF 120, an SMF 122, for communication with a UE 116, a (R)AN 106, a UPF 102, and a DN 104. The NFs and NF services can communicate directly, referred to as Direct Communication, or indirectly via a SCP 124, referred to as Indirect Communication. FIG. 1 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 1 are described below.

The NSSF 108 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 110 supports exposure of capabilities and events. NF capabilities and events may be securely exposed by the NEF 110 (e.g., for 3rd party, Application Functions, and/or Edge Computing). The NEF 110 may store/retrieve information as structured data using a standardized interface (Nudr) to a UDR. The NEF 110 may also secure provision of information from an external application to 3GPP network and may provide for the Application Functions to securely provide information to the 3GPP network (e.g., expected UE behavior, 5GLAN group information, and service specific information), wherein the NEF 110 may authenticate and authorize and assist in throttling the Application Functions (AFs). The NEF 110 may provide translation of internal-external information by translating between information exchanged with an AF 128 and information exchanged with the internal network function. For example, the NEF 110 translates between an AF-Service-Identifier and internal 5G Core information such as DNN and S-NSSAI. The NEF 110 may handle masking of network and user sensitive information to external AF's according to the network policy. The NEF 110 may receive information from other network functions (based on exposed capabilities of other network functions), and stores the received information as structured data using a standardized interface to a UDR. The stored information can be accessed and re-exposed by the NEF 110 to other network functions and Application Functions, and used for other purposes such as analytics. For external exposure of services related to specific UE(s), the NEF 110 may reside in the HPLMN. Depending on operator agreements, the NEF 110 in the HPLMN may have interface(s) with NF(s) in the VPLMN. When a UE is capable of switching between EPC and 5GC, an SCEF+NEF may be used for service exposure.

The NRF 114 supports service discovery function by receiving an NF Discovery Request from an NF instance or SCP and providing the information of the discovered NF instances to the NF instance or SCP. The NRF 114 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 112 supports a unified policy framework to govern network behavior. The PCF 112 provides policy rules to Control Plane function(s) to enforce them. The PCF 112 accesses subscription information relevant for policy decisions in a Unified Data Repository (UDR). The PCF 112 may access the UDR located in the same PLMN as the PCF.

The UDM 126 supports generation of 3GPP AKA Authentication Credentials, User Identification Handling (e.g., storage and management of subscription permanent identifier (SUPI) for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 126 uses subscription data (including authentication data) that may be stored in a UDR, in which case a UDM implements the application logic and may not require an internal user data storage and several different UDMs may serve the same user in different transactions. The UDM 126 may be located in the HPLMN of the subscribers it serves, and may access the information of the UDR located in the same PLMN.

The AUSF 118 supports authentication for 3GPP access and entrusted non-3GPP access. The AUSF 118 may also provide support for Network Slice-Specific Authentication and Authorization.

The AMF 120 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 120. Regardless of the number of Network functions, in certain embodiments there is only one NAS interface instance per access network between the UE and the CN, terminated at one of the Network functions that implements at least NAS security and Mobility Management. The AMF 120 may also include policy related functionalities.

In addition to the functionalities described above, the AMF 120 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 122 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 122 may include policy related functionalities.

The SCP 124 includes one or more of the following functionalities: Indirect Communication; Delegated Discovery; message forwarding and routing to destination NF/NF services; communication security (e.g., authorization of the NF Service Consumer to access the NE Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 124 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 116 may include a device with radio communication capabilities. For example, the UE 116 may comprise a smartphone (e.g., handheld touchscreen mobile computing devices connectable to one or more cellular networks). The UE 116 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 116 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 116 may be configured to connect or communicatively couple with the (R)AN 106 through a radio interface 130, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 116 and the (R)AN 106 may use a Uu interface (e.g., an LTE-Uu interface) to exchange control plane data via a protocol stack comprising a PRY layer, an MAC layer, an RLC layer, a PDCP layer, and an RRC layer. A DL transmission may be from the (R)AN 106 to the UE 116 and a UL transmission may be from the UE 116 to the (R)AN 106. The UE 116 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 106 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 106 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 106) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 116 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 102 may act as an anchor point for intra-RAT and inter-RAT mobility, an external PDU session point of interconnect to the DN 104, and a branching point to support multi-homed PDU session. The UPF 102 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 102 may include an uplink classifier to support routing traffic flows to a data network. The DN 104 may represent various network operator services, Internet access, or third party services. The DN 104 may include, for example, an application server.

Figure 2:
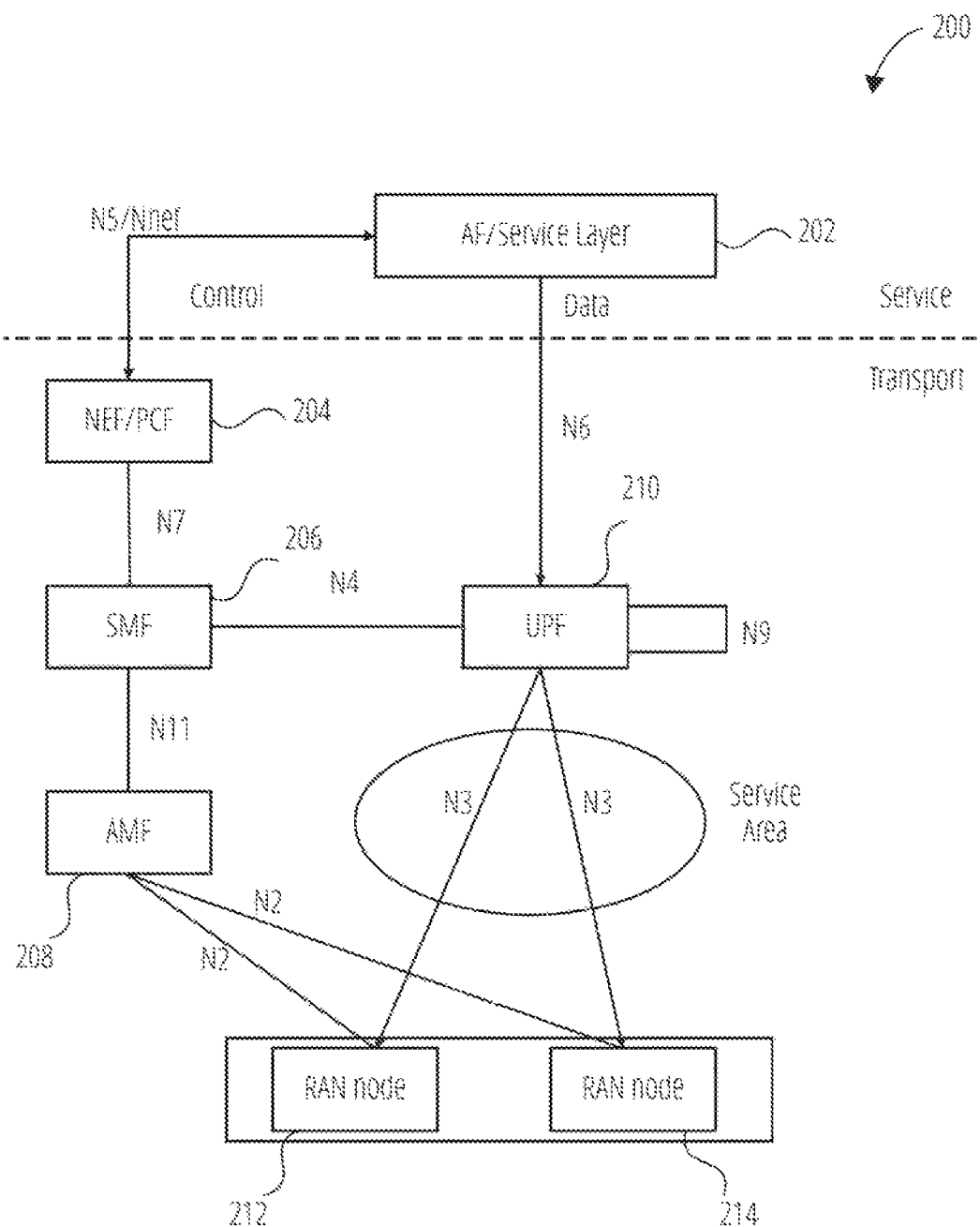
FIG. 2 illustrates an example unicast-based architecture in accordance with certain embodiments.

Currently, there are two 5G NR MBS architecture options. FIGS. 1 and 2 illustrate the first of the two architecture options, referred to as a unicast based architecture. In particular, FIG. 2 illustrates the transport-only architecture 200 of a unicast based architecture, which may not include any new network functions (NFs). In particular, the transport-only architecture 200 includes AF 202, NEF/PCF 204, SMF 206, AMF 208, UPF 210, RAN node 212, and RAN node 214. FIG. 2 also shows corresponding service-based interfaces and reference points N5/Nnef, N2, N3, N4, N6, N7, and N11.

Figure 3:
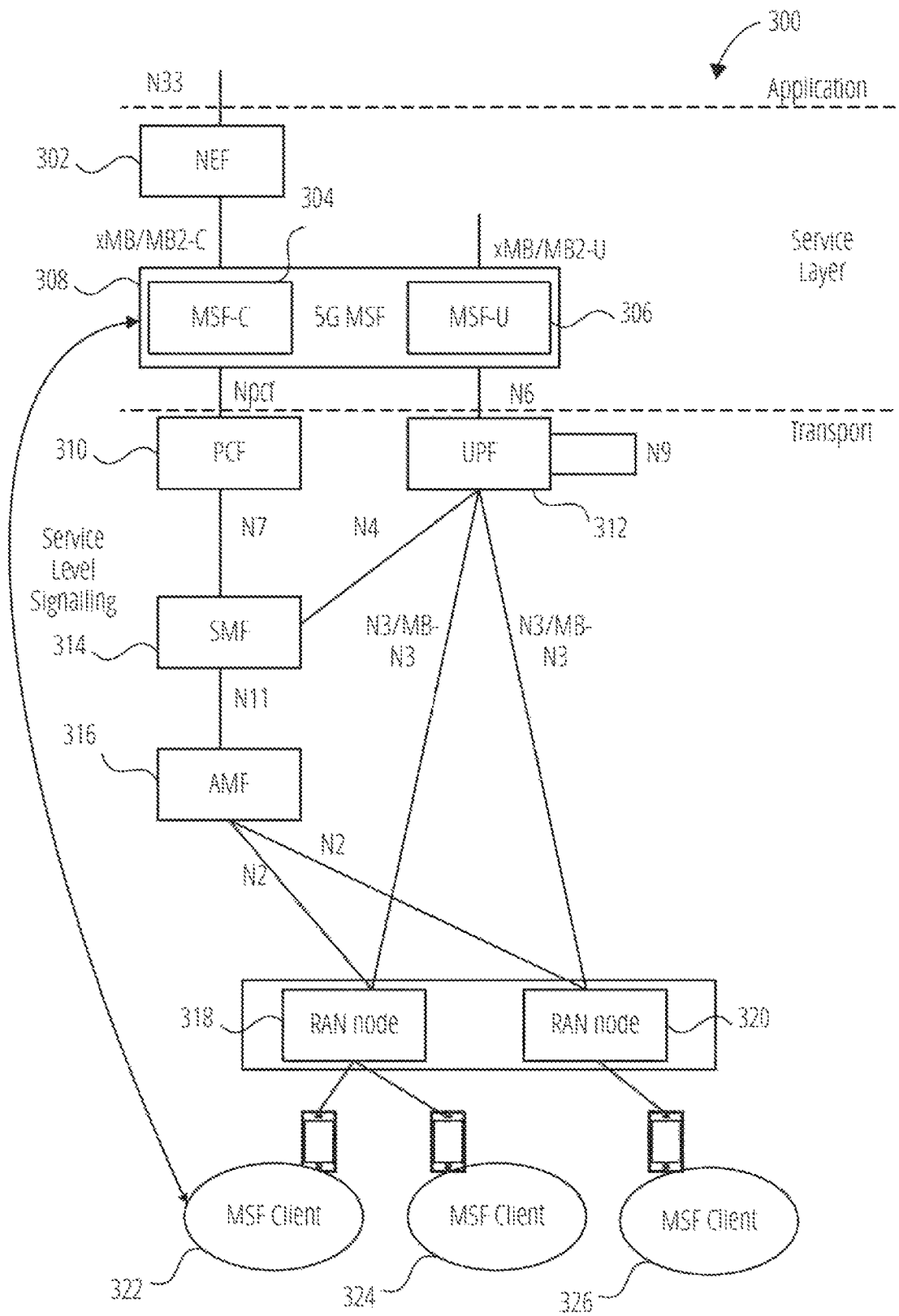
FIG. 3 illustrates an example unicast-based architecture in accordance with certain embodiments.

FIG. 3 illustrates a service layer architecture 300 of the unicast based architecture, which includes multiservice switching forum-C (MSF-C) and MSF-U for MBS session management. In particular, FIG. 3 illustrates the service layer architecture 300 of the unicast based architecture, which may not include any new network functions (NFs). In particular, the service layer architecture 300 includes NEF 302, 5G rnulticast service function (i.e., 5G MSF 308) (including MSF-control plane (MSF-C 304) and MSF-user plane (MSF-U 306)), PCF 310, UPF 312, SMF 314, AMF 316, RAN node 318, RAN node 320, MSF Client 322, MSF Client 324, and MSF Client 326. FIG. 3 also shows corresponding service-based interfaces and reference points xMB/MB2-C, xMB/MB2-U, Npcf, N2, N3/MB-N3, N4, N6, N7, N11, and N33.

Figure 4:
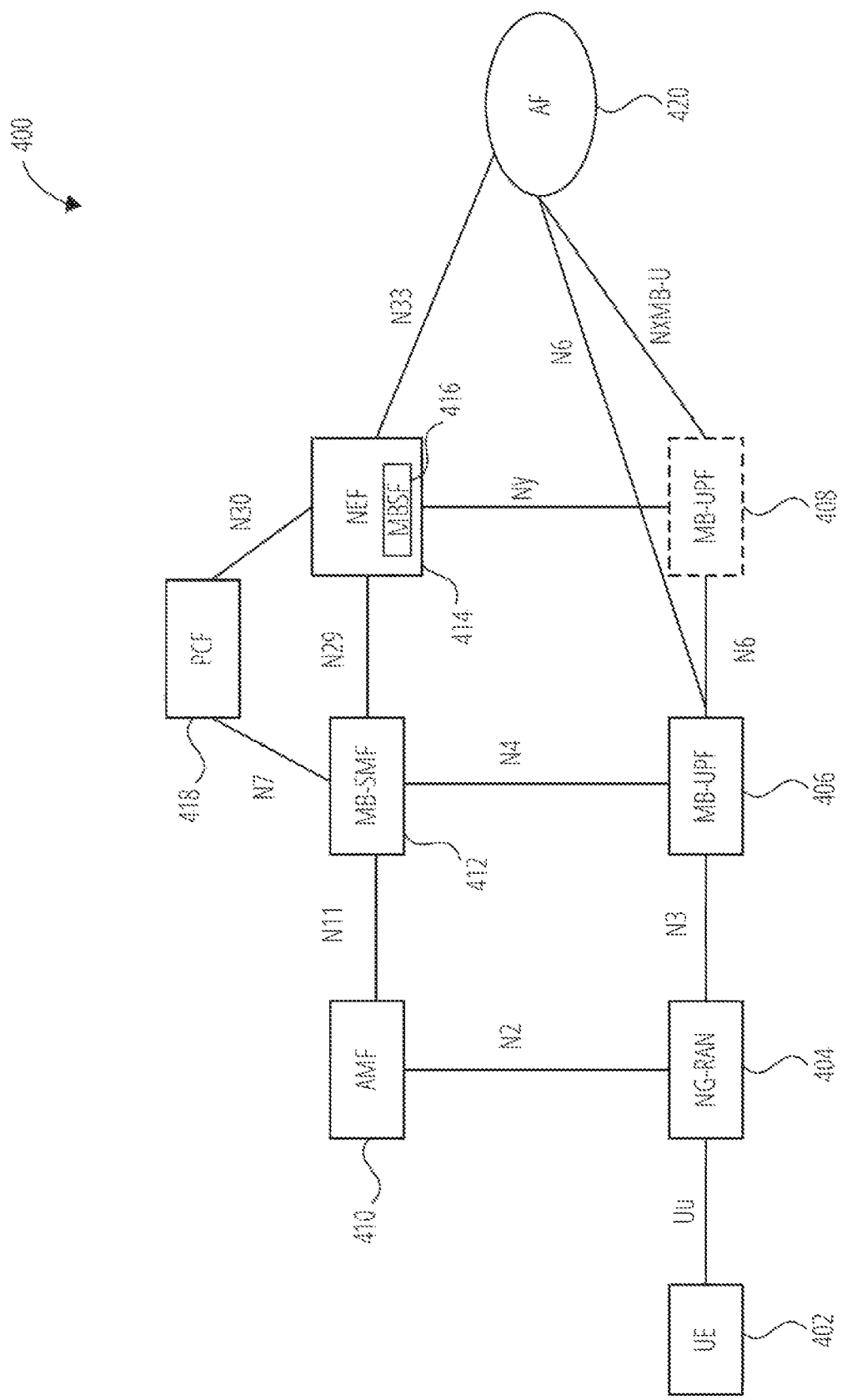
FIG. 4 illustrates an example architecture in accordance with certain embodiments.

FIG. 4 illustrates the second architecture option 400 of the two architecture options, which includes dedicated MB network functions. The architecture of FIG. 4 introduces MBSF (i.e., control plane) and MBSU (i.e., user plane), as well as dedicated MB-SMF and MB-UPF functions. In addition, FIG. 4 includes UE 402, NG-RAN 404, MB-UPF 406, MB-UPF 408, AMF 410, MB-SMF 412, NEF 414, MBSF 416, PCF 418, and AF 420. FIG. 4 also shows corresponding service-based interfaces and reference points Uu, N2, N3, N4, N6, N7, N11, N29, N30, N33, Ny, and NxMB-U. Notably, the principles and solutions described herein may be utilized with respect to both architecture option 1 and architecture option 2 as illustrated in FIGS. 2/3 and FIG. 4, respectively.

Figure 5:
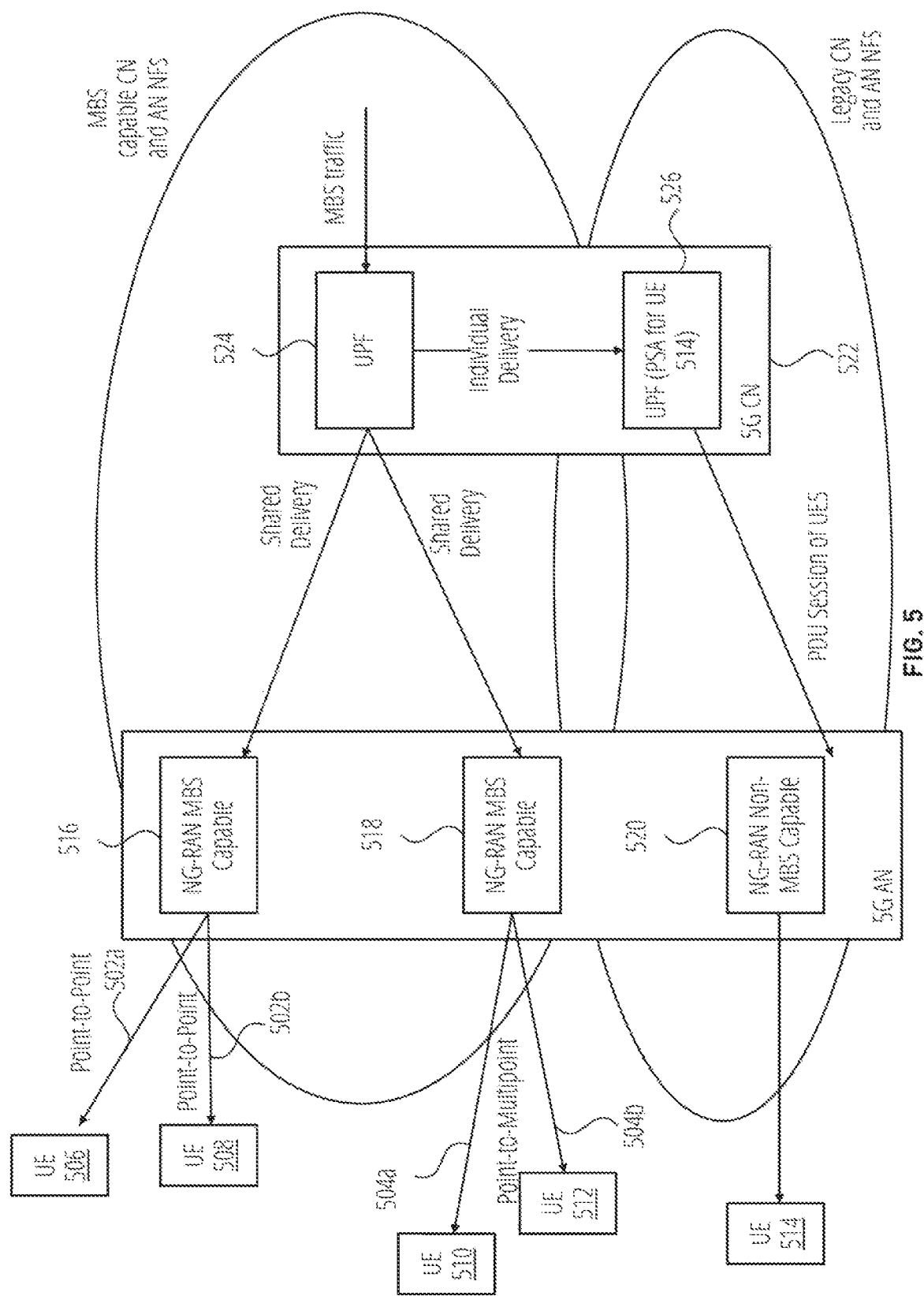
FIG. 5 illustrates an example of point-to-point delivery and point-to-multipoint delivery in accordance with certain embodiments.

In addition, the principles and solutions described herein may be applicable to various MBS traffic delivery models. For instance, two options for MBS traffic delivery models: 1. Point-to-Point (PTP) delivery method (represented by arrow 502a and arrow 502b); and 2. Point-to-multipoint (PTM) delivery method (represented by arrow 504a and arrow 504b), are illustrated in FIG. 5. For the provision of PTP and PTM, the FIG. 5 includes 5G CN 522, UPF 524, UPF 526, NG-RAN MBS capable 516, NG-RAN MBS capable 518, and NG-RAN non-MBS capable 520. In addition, FIG. 5 includes UE 506, UE 508, UE 510, UE 512, and UE 514.

Notably, the PTP delivery method includes two options, as follows: 1. Keys are provisioned uniquely for each UE. For instance, a UE 506 and a UE 508 may be provisioned different keys, so that if one of the UE 506 or the UE 508 is compromised, the comprised UE's key will not be in danger of being used for the other UE; and 2. Keys provisioned for the UE 506 and the UE 508 are (or can be) the same. Notably, the second option may have a lower security level. As also illustrated in FIG. 5, the PTM delivery method utilizes the same keys for a UE 510 and a UE 512 because the stream including the keys is sent in the same packet(s).

With respect to multimedia broadcast multicast services (MBMS) security functionality, the current security mechanism used in the packet data convergence protocol (PDCP) layer can also be reused in PTP mode. At the same time, a new security mechanism for PIP can also be designed. For instance, such a new security mechanism may include the following configuration details: 1. The security credentials may be provided via an access stratum (AS) procedure or provided in a non-access stratum (NAS) procedure (MBMS session join/start); 2. The keys for different UEs for one specific MBMS may be unique or common; and 3. The cryptography method may be symmetric or asymmetric.

In addition, such a new security mechanism may include the following UE side handling details: 1. The UE may acquire the MBMS security configuration for the interested MBMS service via CONNECTED mode; and 2. The UE may store the MBMS security configuration and use it for verifying the security of the received MBMS service.

Three possible detailed solutions are provided herein and may be particularly applicable to TR 23.757 solution #2, Clause 6.2.2. However, these principles (i.e., the three detailed solutions) may be easily applied to other solutions, as well. In particular, security credentials for these solutions may include the following: 1. Keys for decryption; 2. Algorithms to be used; and 3. Other security credentials needed to decrypt a stream.

For example, with respect to security credentials, the encryption algorithm may be advanced encryption standard (AES) and the credentials may include (key, AES, null). If the IDE (RFC6507) is used, then the credentials may include (key, IDE, gNB_ID information).

Notably, MB-SW is used as an example herein for providing the functionality of delivering credentials, but such comprises only one option. For instance, authentication server function (AUSF) may be used to provide similar functionality utilizing the principles described herein. In addition, either symmetric cryptography or asymmetric cryptography may be utilized for each of the three detailed solutions described herein.

As an overview of the three detailed solutions described herein, the following may apply: 1. The first detailed solution may include: a. For one specific MBMS, Keys for PTP and PTM may be different; b. Current PDCP keys may be reused for PTP; and c. New keys may be created for PTM; 2. The second detailed solution may include: a. For one specific MBMS, Keys for PTP and PTM may be different; b. New unique keys may be created for PTP; and c. New keys may be created for PTM; and 3. The third detailed solution may include a. For one specific MBMS, Keys for PTP and PTM may be the same; and b. New common keys may be created for both PTP and PTM.

Figure 6:
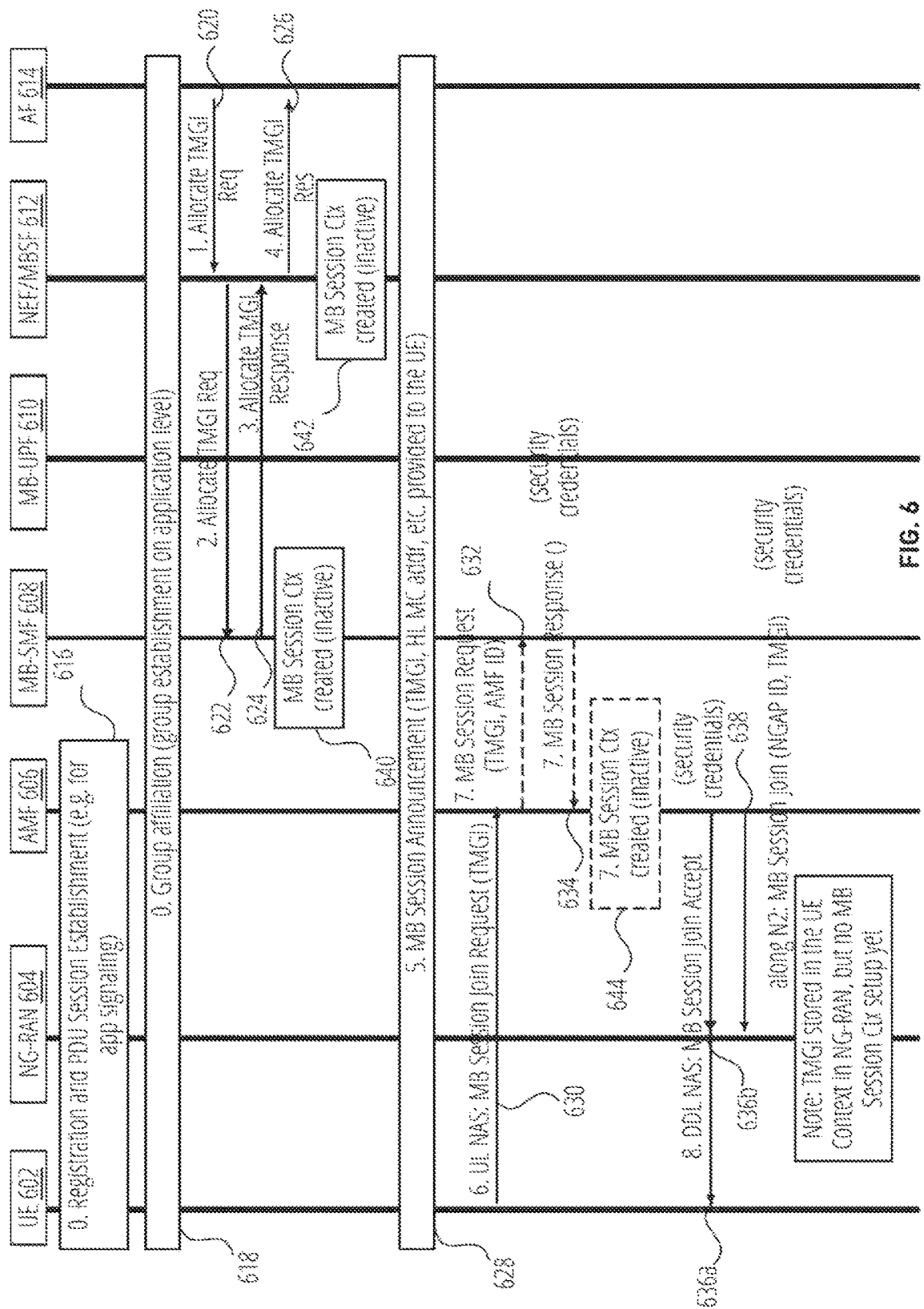
FIG. 6 illustrates a communication flowchart of MBS-key distribution in accordance with certain embodiments.

FIG. 6 illustrates a communication flowchart of MBS-key distribution, which is further discussed with respect to each of the three detailed solutions below. As shown, FIG. 6 includes a UE 602, an NG-radio access network (i.e., NG-RAN 604), an access and mobility management function (i.e., AMF 606), an MB-session management function (i.e., MB-SMF 608), an MB-user plane function (i.e., MB-UPF 610), a network exposure function/MBSF (i.e., NEF/MBSF 612), and an application function (i.e., AF 614). Notably, steps 1 through 5 may be a same procedure as compared to a SA2 procedure. In step 0, the UE 602 may perform a registration procedure and a protocol data unit (PDU) session establishment (i.e., as illustrated by block 616). The NEF/MBSF 612 may establish a new MB Session Context (as shown by block 640 and block 642) and the AF may inform the members in the group (e.g., the UE 602, the NG-RAN 604, and so forth) of various group info (e.g., temporary mobile group identity (TMGI), HL MC Address provided to the UE—see GCSE TS 23.468), as illustrated by arrow 620 through arrow 626 and block 628.

In step 6 and as represented by arrow 630, the UE 602 may indicate its interest to join an MB Session by sending a UL NAS MB Session Join Request (TMGI) message, which may be forwarded by the NG-RAN 604 to the AMF 606. The AMF 606 may then store the TMGI in its UE Context.

In step 7, if the AMF 606 does not already have an MB Session Context for the received TMGI (in step 6), the AMF may select an MB-SMF 608 for the TMGI by querying the network repository function (NRF). Continuing in step 7, an MB Session Request (TMGI, AMF ID) message may be sent from the AMF 606 to the MB-SMF 608 to announce the AMF's interest in the MB Session (as represented by arrow 632). Continuing in step 7, when the MB-SMF 608 has returned a MB Session Response ( ) message (as represented by arrow 634), the AMF 606 may create an MB Session Context in an 'inactive' state for the TMGI (as shown by block 644).

The AMF 606 may store the TMGI and the NG RAN ID of the originating node of the N2 message (in step 6) in the AMF 606 MB Session Context. In step 8, the AMF 606 may create a DL NAS MB Session Join Response ( ) message and piggy back that on an N2 MB Session Join (NGAP ID, TMGI) message (as represented by arrow 636a, arrow 636b, and arrow 638). The NG-RAN 604 may store the TMGI in the UE context in NG-RAN.

As an overview of the first detailed solution, the keys for PTP and PTM are different. In PTP mode, current NAS keys may be reused, and the gNB (i.e., base station) may use the KNASenc to encrypt the MBS packets. In addition, in PTM mode, MB-SMF may generate keys for every UE subscribed to one specific MBS and deliver the keys to such UEs in the DL NAS messages "MB session join accept".

The communication flow for PTM mode for the first detailed solution may be as follows: 1. Steps 1 through 5 may be the same as the SA2 procedure and as discussed above with respect to FIG. 6). The UE may perform the registration procedure and the protocol data unit (PDU) session establishment while the NEF/MBSF establishes a new MB session context. The AF may also inform the members in the group of various group information (e.g., TMGI, HL MC Address); 2. In Step 6, the UE may indicate its interest in joining an MB Session by sending an UL NAS MB Session join request message (e.g., that may include a TMGI). The NG-RAN may then forward the NAS message to the AMF. The AMF may then store the TMGI in its UE Context; 3. In Step 7, if the AMF does not already have a MB Session Context for the received TMGI in Step 6, the AMF may select an MB SMF for the TMGI by querying the NRF. An MB Session Request message (i.e., that may include TMGI, AMF ID) may be sent to the MB SMF to announce the AMF's interest in the MB Session. The MB-SMF may derive the keys for PTM for every UE and gNB (or base station) using the UE ID and TMGI. When the MB-SW has returned a MB Session Response message, the credentials for both the gNB and the UE may be included. The AMF may create a MB Session Context in an 'inactive' state for the TMGI. Notably, the UE ID could be SUPI, generic public subscription identifier (GPSI) or other IDs. The UE ID, however, has to be able to uniquely identify one UE; and 4. In Step 8, the AMF may store the TMGI and the NG RAN ID of the originating node of the N2 message (in step 6) in the AMF MB Session Context. The AMF may create a DL NAS MB Session Join Response ( ) message and piggy back that on an N2 MB Session Join message (e.g., that may include NG application protocol ID (NGAP ID), TMGI). The NG-RAN may store the TMGI and the UE's security credential in the UE context in NG-RAN. The UE receives the DL NAS message and stores the UE security credentials. In addition, the NG-RAN receives the N2 message and stores gNB's security credentials. When the MBS session starts, the gNB may use the keys to encrypt the MBS packets and the UE may use the received keys to decrypt the MBS packets. Such keys may be symmetric or asymmetric.

As an overview of the second detailed solution, the keys for PTP and PTM are different. In PTP mode, the MB-SMF generates unique keys for every UE for MBS and delivers the keys to the UE in the DL NAS messages "MB session join accept." In PTM mode, the MB-SMF generates the same key for a group of UEs subscribed to one specific MBS and delivers the keys to the UEs in a DL NAS messages "MB session join accept".

The communication flow for both PTP and PTM mode for the second detailed solution may be as follows: 1. Steps 1 through 5 may be the same as the SA2 procedure (and as shown in FIG. 6). The UE performs the registration procedure and the PDU session establishment, the NEF/MBSF establishes a new MB Session Context, and the AF informs the members in the group of various group information (e.g., TMGI, HL MC Address); 2. In Step 6, the UE indicates its interest to join an MB Session by sending a UL NAS MB Session Join Request message (e.g., that may include TMGI). The NG-RAN forwards the NAS message to the AMF and the AMF stores the TMGI in its UE Context; 3. In Step 7, if the AMF does not already have a MB Session Context for the received TMGI (in step 6), the AMF selects an MB SMF for the TMGI by querying the NRF. An MB Session Request message (e.g., that may include TMGI, AMF ID) is sent to the MB SMF to announce the AMF's interest in the MB Session. The MB-SMF derives the keys for PTP and PTM respectively for every UE and gNB (or base station) using the UE ID and TMGI. When the MB-SMF has returned a MB Session Response ( ) message, the credentials for both the gNB(s) and the UE(s) are included. The AMF creates a MB Session Context in an 'inactive' state for the TMGI. Notably, the UE ID may be SUPI, GPSI or other IDs. The UE ID, however, has to be able to uniquely identify one UE. In Step 8, the AMF stores the TMGI and the NG RAN ID of the originating node of the N2 message (in step 6) in the AMF MB Session Context. The AMF creates a DL NAS MB Session Join Response ( ) message and piggy backs that on an N2 MB Session Join message (e.g., that may include NGAP ID, TMGI). The NG-RAN stores the TMGI and the UE's security credential in the UE context in NG-RAN. The UE receives the DL NAS message and stores the UE security credentials. The NG-RAN receives the N2 message and stores the gNB's security credentials, as well. When the MBS session starts, the gNB may use the keys to encrypt the MBS packets and the UE may use the received keys to decrypt the MBS packets. Such keys may be symmetric or asymmetric.

In a variation on the second detailed solution, referred to herein as solution 2.1, in PTP mode, the MB-SMF generates the same keys for a group of UEs subscribed to one specific MBS. Such an embodiment may include both advantages and disadvantages. For instance, an advantage may be that it is simpler for the MB-SMF to manage MBS keys because the total amount of keys is much fewer. In contrast, a disadvantage may be that the security level is lower. Since a group of UEs share one same key for one MBS, the compromising of any UE may lead to key leakage. In addition, when symmetric cryptography is used, the MB-SMF may generate the same key for a group of UEs for both PTP and PTM mode.

As an overview of the third detailed solution, the keys for PTP and PTM are the same. Because the packet to a group of UEs are the same in PTM mode, the MB-SMF generates the same key for every UE for one specific MBS and delivers the keys to the UE in a DL NAS message "MB session join accept". Such key is used in both PTP and PTM mode.

The communication flow for both PTP and PTM mode for the third detailed solution may be as follows: 1. Steps 1 through 5 are the same as the SA2 procedure (and as shown in FIG. 6). The UE performs the registration procedure and the PDU session establishment, the NEF/MBSF establishes a new MB Session Context, and the AF informs the members in the group of various group information (e.g., TMGI, HL MC Address); 2. In Step 6, the UE indicates its interest to join an MB Session by sending a UL NAS MB Session Join Request message (e.g., that may include TMGI). The NG-RAN forwards the NAS message to the AMF and the AMF stores the TMGI in its UE Context; 3. In Step 7, if the AMF does not already have a MB Session Context for the received TMGI (in step 6), the AMF selects an MB SMF for the TMGI by querying the NRF. An MB Session Request message (e.g., that may include TMGI, AMF ID) is sent to the MB SMF to announce the AMF's interest in the MB Session. The MB-SMF derives the keys for both PTP and PTM for every UE and every gNB (or base station) using the UE ID and TMGI. When the MB-SMF has returned a MB Session Response ( ) message, the credentials for both the gNB and the UE are included. The AMF creates a MB Session Context in an 'inactive' state for the TMGI. Notably, the UE ID may be SUPI, GPSI or other IDs. The UE ID, however, has to be able to uniquely identify one UE; and 4. In Step 8, the AMF stores the TMGI and the NG RAN ID of the originating node of the N2 message (in step 6) in the AMF MB Session Context. The AMF creates a DL NAS MB Session Join Response ( ) message and piggy backs that on an N2 MB Session Join message (e.g., that may include NGAP ID, TMGI). The NG-RAN stores the TMGI and the UE's security credential in the UE context in NG-RAN. The UE receives the DL NAS message and stores the UE security credentials. The NG-RAN receives the N2 message and stores the gNB's security credentials, as well. When the MBS session starts, the gNB may use the keys to encrypt the MBS packets and the UE may use the received keys to decrypt the MBS packets. Such keys may be symmetric or asymmetric.

Figure 7:
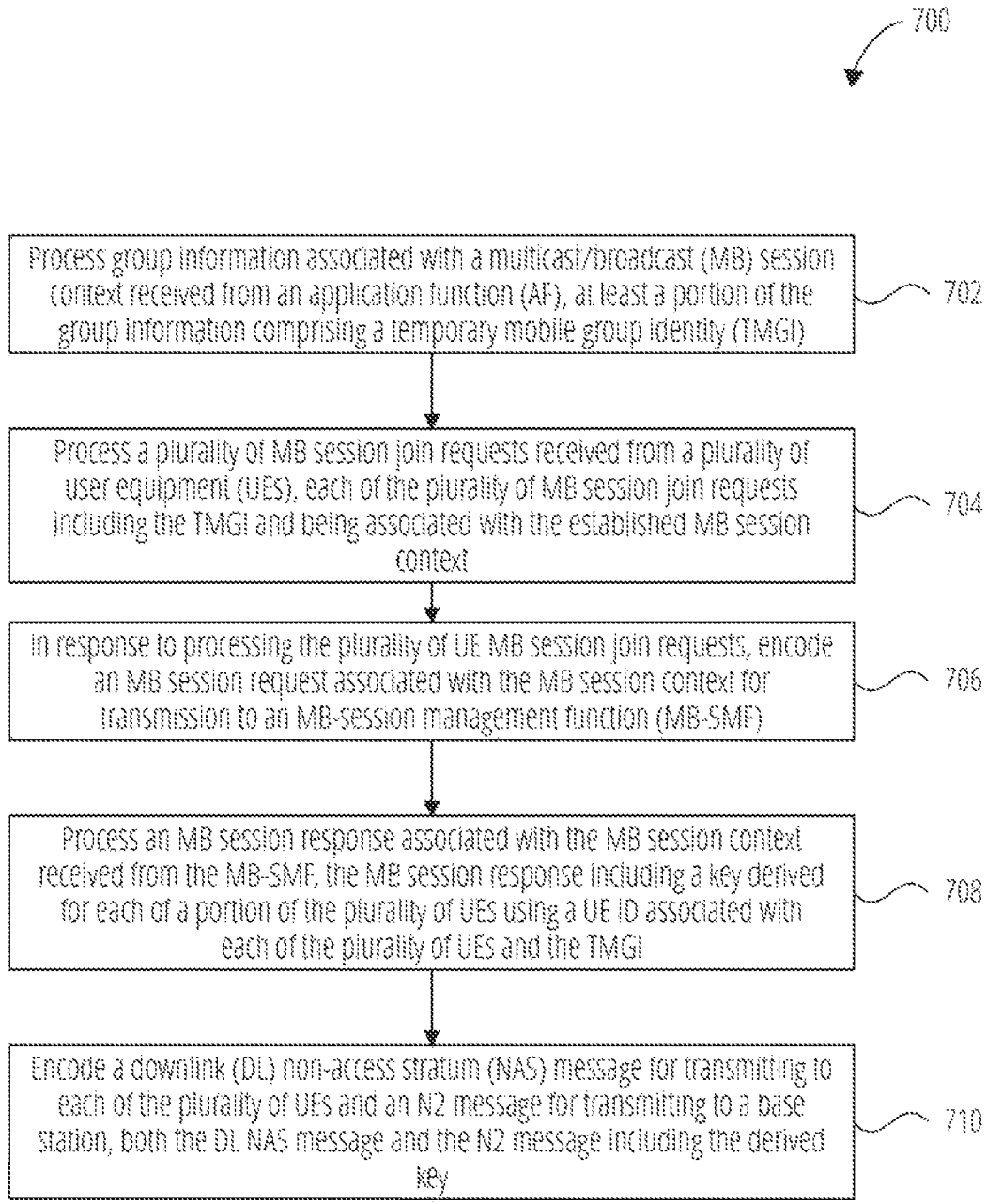
FIG. 7 illustrates a flowchart of an example method for distributing MBS keys.

FIG. 7 illustrates a flowchart of a method 700 for distributing MBS keys. In block 702, the method 700 processes group information associated with a multicast/broadcast (MB) session context received from an application function (AF). At least a portion of the group information may comprise a temporary mobile group identity (TMGI). In block 704, the method 700 processes a plurality of MB session join requests received from a plurality of user equipment (UEs). Each of the plurality of MB session join requests may include the TMGI and be associated with the established MB session context.

In block 706, the method 700, in response to processing the plurality of UE MB session join requests, encodes an MB session request associated with the MB session context for transmission to an MB-session management function (MB-SMF). In block 708, the method 700 processes an MB session response associated with the MB session context received from the MB-SMF. The MB session response may include a key derived for each of a portion of the plurality of UEs using a UE ID associated with each of the plurality of UEs and the TMGI. In block 710, the method 700 encodes a downlink (DL) non-access stratum (NAS) message for transmitting to each of the plurality of UEs and an N2 message for transmitting to a base station. Both the DL NAS message and the N2 message may include the derived key.

The method 700 may include each derived key being delivered to the portion of the plurality of UEs via point-to-multipoint (PTM) delivery. Each derived key may be identical for each of the portion of the plurality of UEs. The method 700 may also include one or more NAS keys being reused and delivered to a second, different portion of the plurality of UEs via point-to-point (PTP) delivery. The method 700 may also include the derived key and the NAS keys being different.

The method 700 may also include the UE ID being unique for each of the portion of UEs and comprising one of a subscription permanent identifier (SUPI) or a generic public subscription identifier (GPSI). The method 700 may also include the derived key being configured to allow the base station to encrypt MBS packets for transmission and the portion of UEs to decrypt the encrypted MBS packets. The method 700 may also include the derived key utilizing symmetric cryptography.

Figure 8:
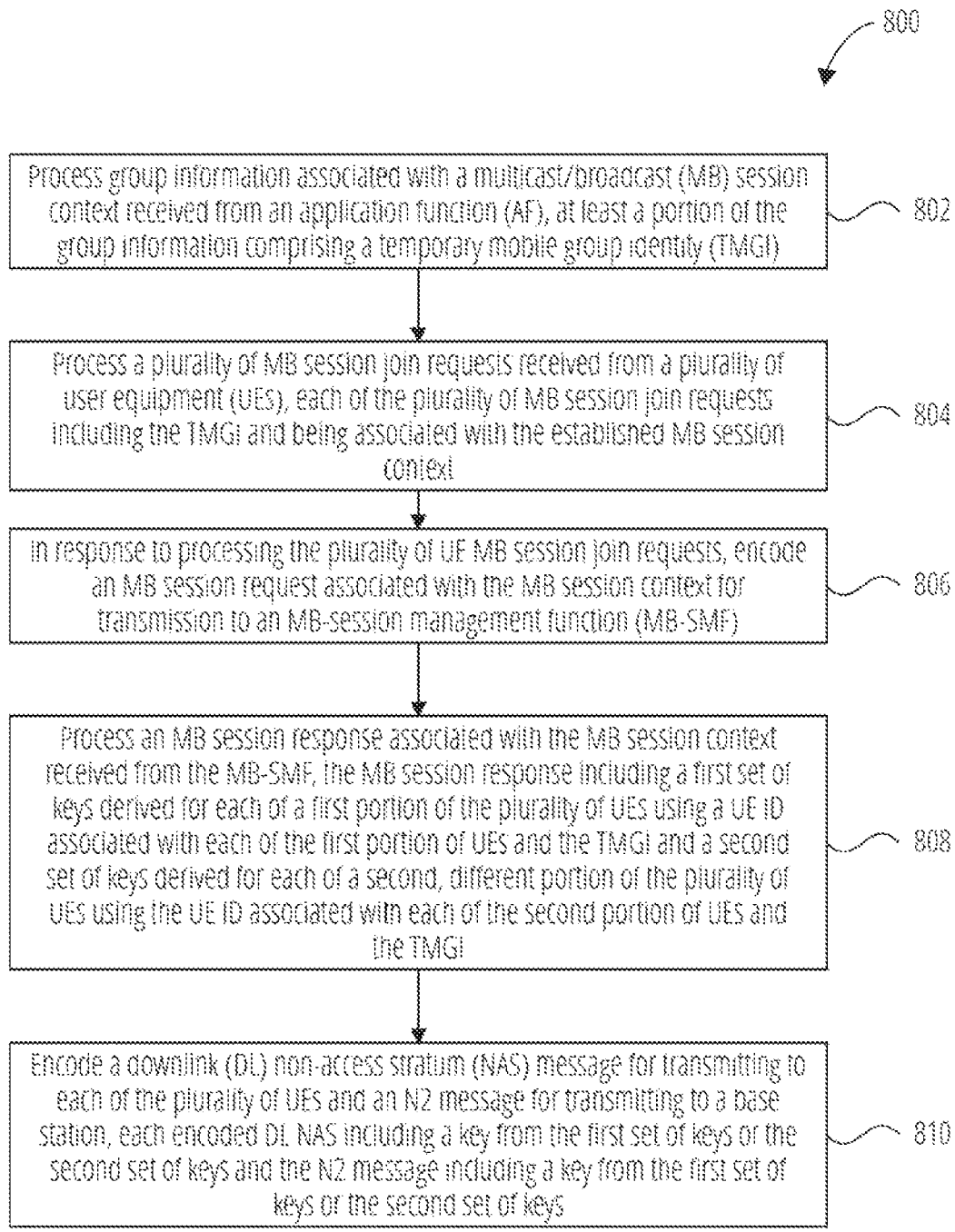
FIG. 8 illustrates a flowchart of an example method for distributing MBS keys.

FIG. 8 illustrates a flowchart of a method 800 for distributing MBS keys. In block 802, the method 800 processes group information associated with a multicast/broadcast (MB) session context received from an application function (AF). At least a portion of the group information may comprise a temporary mobile group identity (TMGI). In block 804, the method 800 processes a plurality of MB session join requests received from a plurality of user equipment (UEs). Each of the plurality of MB session join requests may include the TMGI and be associated with the established MB session context. In block 806, the method 800, in response to processing the plurality of UE MB session join requests, encodes an MB session request associated with the MB session context for transmission to an MB-session management function (MB-SMF).

In block 808, the method 800 processes an MB session response associated with the MB session context received from the MB-SMF. The MB session response may include a first set of keys derived for each of a first portion of the plurality of UEs using a UE ID associated with each of the first portion of UEs and the TMGI and a second set of keys derived for each of a second, different portion of the plurality of UEs using the UE ID associated with each of the second portion of UEs and the TMGI. In block 810, the method 800 encodes a downlink (DL) non-access stratum (NAS) message for transmitting to each of the plurality of UEs and an N2 message for transmitting to a base station. Each encoded DL NAS may include a key from the first set of keys or the second set of keys and the N2 message may include a key from the first set of keys or the second set of keys.

The method 800 may also include the second set of keys being delivered to the second portion of UEs via point-to-multipoint (PTM) delivery and each of the second set of keys being identical. The method 800 may also include the first set of keys being delivered to the first portion of UEs via point-to-point (PTP) delivery and each of the first set of keys being uniquely associated with one of the first portion of UEs. The method 800 may also include the first set of keys being different than the second set of keys. The method 800 may also include the first set of keys being delivered to the first portion of UEs via point-to-point (PTP) delivery and each of the first set of keys being identical.

The method 800 may include the UE ID being unique for each of the plurality of UEs and comprising one of a subscription permanent identifier (SUPI) or a generic public subscription identifier (GPSI). The method 800 may include each of the first set of keys and each of the second set of keys being configured to allow the base station to encrypt MBS packets for transmission and a corresponding UE of the plurality of UEs to decrypt the encrypted MBS packets. The method 800 may also include at least a portion of the first set of keys or the second set of keys utilizing asymmetric cryptography.

Figure 9:
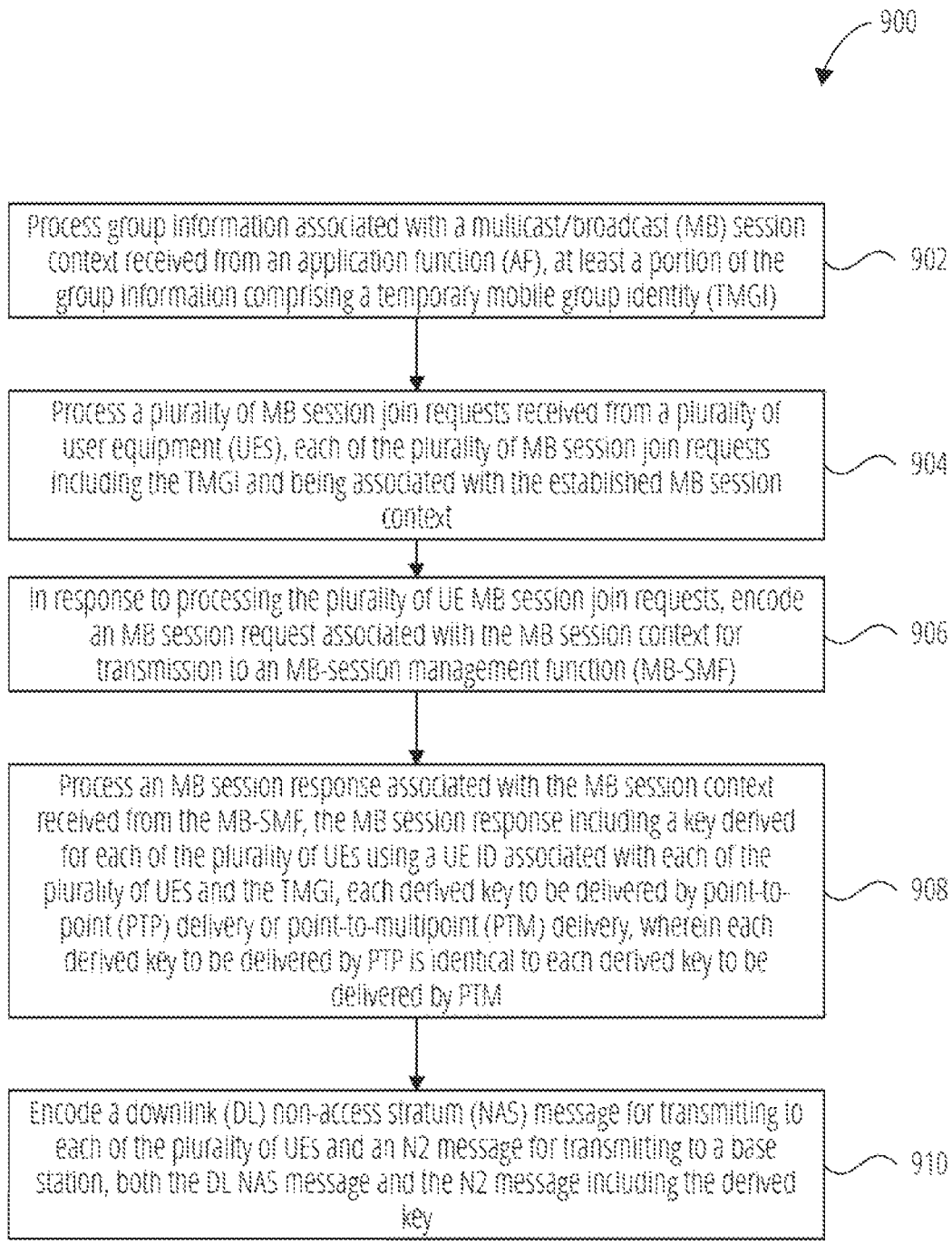
FIG. 9 illustrates a flowchart of an example method for distributing MBS keys.

FIG. 9 illustrates a flowchart of a method 900 for distributing MBS keys. In block 902, the method 900 processes group information associated with a multicast/broadcast (MB) session context received from an application function (AF). At least a portion of the group information may comprise a temporary mobile group identity (TMGI). In block 904, the method 900 processes a plurality of MB session join requests received from a plurality of user equipment (UEs). Each of the plurality of MB session join requests may include the TMGI and be associated with the established MB session context. In block 906, the method 900, in response to processing the plurality of UE MB session join requests, encodes an MB session request associated with the MB session context for transmission to an MB-session management function (MB-SMF).

In block 908, the method 900 processes an MB session response associated with the MB session context received from the MB-SMF. The MB session response may include a key derived for each of the plurality of UEs using a UE ID associated with each of the plurality of UEs and the TMGI. Each derived key may be delivered by point-to-point (PTP) delivery or point-to-multipoint (PTM) delivery. Each derived key to be delivered by PTP is identical to each derived key to be delivered by PTM. In block 910, the method 900 encodes a downlink (DL) non-access stratum (NAS) message for transmitting to each of the plurality of UEs and an N2 message for transmitting to a base station. Both the DL NAS message and the N2 message may include the derived key.

The method 900 may also include the UE ID being unique for each of the plurality of UEs and comprising one of a subscription permanent identifier (SUPI) or a generic public subscription identifier (GPSI). The method 900 may also include the derived key being configured to allow the base station to encrypt MBS packets for transmission and the plurality of UEs to decrypt the encrypted MBS packets. The method 900 may include the derived key utilizing symmetric cryptography.

Figure 10:
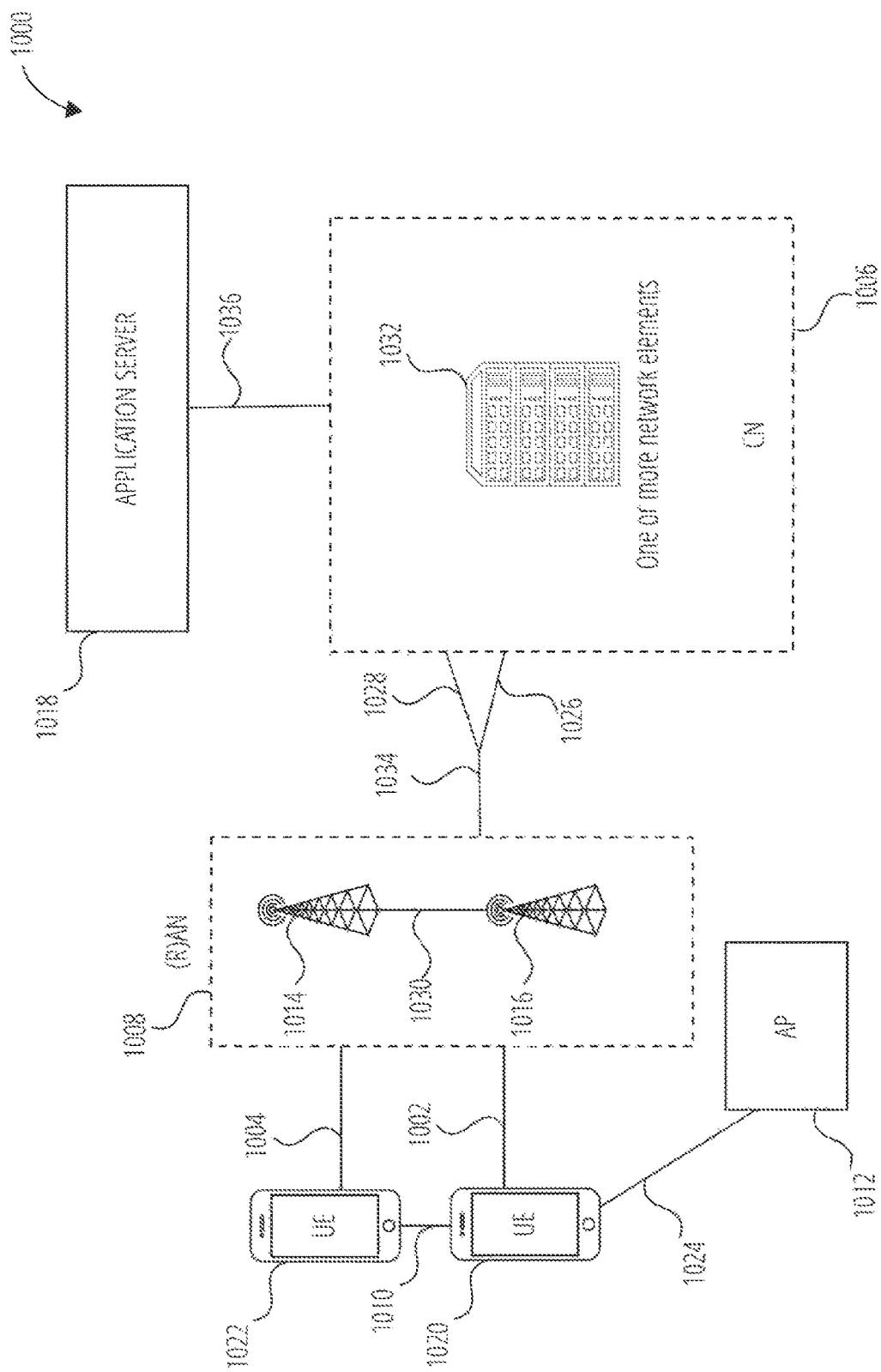
FIG. 10 illustrates a system in accordance with one embodiment.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1022 and UE 1020. In this example, the UE 1022 and the UE 1020 are illustrated as smartphones e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 1022 and/or the UE 102.0 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1022 and UE 1020 may be configured to connect, for example, communicatively couple, with an access node or radio access node (shown as (R)AN 1008). In embodiments, the (R)AN 1008 may be an NG RAN or a SG RAN, an E-UTRAN, or a legacy RAN, such as a UTRAN or GERAN. As used herein, the term "NG RAN" or the like may refer to a (R)AN 1008 that operates in an NR or SG system, and the term "E-UTRAN" or the like may refer to a (R)AN 1008 that operates in an LTE or 4G system. The UE 1022 and UE 1020 utilize connections (or channels) (shown as connection 1004 and connection 1002, respectively), each of which comprises a physical communications interface or layer (discussed in further detail below).

In this example, the connection 1004 and connection 1002 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 1022 and UE 1020 may directly exchange communication data via a ProSe interface 1010. The ProSe interface 1010 may alternatively be referred to as a sidelink (SL) interface 110 and may comprise one or more logical channels, including but not limited to a PSCCH, a PSSCH, a PSDCH, and a PSBCH.

The UE 1020 is shown to be configured to access an AP 1012 (also referred to as "WLAN node," "WLAN," "WLAN Termination," "WT" or the like) via connection 1024. The connection 1024 can comprise a local wireless connection, such as a connection consistent with any IEEE 802.11 protocol, wherein the AP 1012 would comprise a wireless fidelity (Wi-Fi®) router. In this example, the AP 1012 may be connected to the Internet without connecting to the core network of the wireless system (described in further detail below). In various embodiments, the UE 1020, (R)AN 1008, and AP 1012 may be configured to utilize LWA operation and/or LWIP operation. The LWA operation may involve the UE 1020 in RRC_CONNECTED being configured by the RAN node 1014 or the RAN node 1016 to utilize radio resources of LTE and WLAN. LWIP operation may involve the UE 1020 using WLAN radio resources (e.g., connection 1024) via IPsec protocol tunneling to authenticate and encrypt packets (e.g., IP packets) sent over the connection 1024. IPsec tunneling may include encapsulating the entirety of original IP packets and adding a new packet header, thereby protecting the original header of the IP packets.

The (R)AN 1008 can include one or more AN nodes, such as RAN node 1014 and RAN node 1016, that enable the connection 1004 and connection 1002. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 1000 (e.g., an eNB). According to various embodiments, the RAN node 1014 or RAN node 1016 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 1014 or RAN node 1016 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 1014 or RAN node 1016); a MAC/PHY split wherein RRC, PDCP, RLC, and MAC layers are operated by the CRAN/vBBUP and the PRY layer is operated by individual RAN nodes (e.g., RAN node 1014 or RAN node 1016), or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 1014 or RAN node 1016 to perform other virtualized applications. In some implementations, an individual RAN node may represent individual gNB-DUs that are connected to a gNB-CU via individual F1 interfaces (not shown by FIG. 10). In these implementations, the gNB-DUs may include one or more remote radio heads or RFEMs, and the gNB-CU may be operated by a server that is located in the (R)AN 1008 (not shown) or by a server pool in a similar manner as the CRAN/vBBUP. Additionally, or alternatively, one or more of the RAN node 1014 or RAN node 1016 may be next generation eNBs (ng-eNBs), which are RAN nodes that provide E-UTRA user plane and control plane protocol terminations toward the UE 1022 and UE 1020, and are connected to an SGC via an NG interface (discussed infra). In V2X scenarios one or more of the RAN node 1014 or RAN node 1016 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 1014 and/or the RAN node 1016 can terminate the air interface protocol and can be the first point of contact for the UE 1022 and UE 1020. In some embodiments, the RAN node 1014 and/or the RAN node 1016 can fulfill various logical functions for the (R)AN 1008 including, but not limited to, radio network controller (RNC) functions such as radio bearer management, uplink and downlink dynamic radio resource management and data packet scheduling, and mobility management.

In embodiments, the UE 1022 and UE 1020 can be configured to communicate using OFDM communication signals with each other or with the RAN node 1014 and/or the RAN node 1016 over a multicarrier communication channel in accordance with various communication techniques, such as, but not limited to, an OFDMA communication technique (e.g., for downlink communications) or a SC-TDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 1014 and/or the RAN node 1016 to the UE 1022 and UE 1020, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 1022 and UE 1020 and the RAN node 1014 and/or the RAN node 1016 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 1022 and UE 1020 and the RAN node 1014 or RAN node 1016 may operate using LAA, eLAA, and/or feLAA mechanisms. In these implementations, the UE 1022 and UE 1020 and the RAN node 1014 or RAN node 1016 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 1022 and UE 1020, RAN node 1014 or RAN node 1016, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 1022, AP 1012, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1022 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 1022 and UE 1020. The PDCCH carries information about the transport format and resource allocations related to the PDSCH channel, among other things. It may also inform the UE 1022 and UE 1020 about the transport format, resource allocation, and HARQ information related to the uplink shared channel. Typically, downlink scheduling (assigning control and shared channel resource blocks to the UE 1020 within a cell) may be performed at any of the RAN node 1014 or RAN node 1016 based on channel quality information fed back from any of the UE 1022 and UE 1020. The downlink resource assignment information may be sent on the PDCCH used for (e.g., assigned to) each of the UE 1022 and UE 1020.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition.

There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 1014 or RAN node 1016 may be configured to communicate with one another via interface 1030. In embodiments where the system 1000 is an LTE system (e.g., when CN 1006 is an EPC), the interface 1030 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1022 from an SeNB for user data; information of PDCP PDUs that were not delivered to a UE 1022; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1000 is a 5G or NR system (e.g., when CN 1006 is an 5GC), the interface 1030 may be an Xn interface. The Xn interface is defined between two or more RAN nodes (e.g., two or more gNBs and the like) that connect to 5GC, between a RAN node 1014 (e.g., a gNB) connecting to 5GC and an eNB, and/or between two eNBs connecting to 5GC (e.g., CN 1006). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1022 in a connected mode (e.g., CM-CONNECTED) including functionality to manage the UE mobility for connected mode between one or more RAN node 1014 or RAN node 1016. The mobility support may include context transfer from an old (source) serving RAN node 1014 to new (target) serving RAN node 1016; and control of user plane tunnels between old (source) serving RAN node 1014 to new (target) serving RAN node 1016. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1008 is shown to be communicatively coupled to a core network-in this embodiment, CN 1006. The CN 1006 may comprise one or more network elements 1032, which are configured to offer various data and telecommunications services to customers/subscribers (e.g., users of UE 1022 and UE 1020) who are connected to the CN 1006 via the (R)AN 1008. The components of the CN 1006 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1006 may be referred to as a network slice, and a logical instantiation of a portion of the CN 1006 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NVF systems can be used to execute virtual or reconfigurable implementations of one or more EPC components/functions.

Generally, an application server 1018 may be an element offering applications that use IP bearer resources with the core network (e.g., UMTS PS domain, LTE PS data services, etc.). The application server 1018 can also be configured to support one or more communication services (e.g., VoIP sessions, PTT sessions, group communication sessions, social networking services, etc.) for the UE 1022 and UE 1020 via the EPC. The application server 1018 may communicate with the CN 1006 through an IP communications interface 1036.

In embodiments, the CN 1006 may be an SGC, and the (R)AN 116 may be connected with the CN 1006 via an NG interface 1034. In embodiments, the NG interface 1034 may be split into two parts, an NG user plane (NG-U) interface 1026, which carries traffic data between the RAN node 1014 or RAN node 1016 and a UPF, and the S1 control plane (NG-C) interface 1028, which is a signaling interface between the RAN node 1014 or RAN node 1016 and AMFs.

In embodiments, the CN 1006 may be a SG CN, while in other embodiments, the CN 1006 may be an EPC). Where CN 1006 is an EPC, the (R)AN 116 may be connected with the CN 1006 via an S1 interface 1034. In embodiments, the S1 interface 1034 may be split into two parts, an S1 user plane (S1-U) interface 1026, which carries traffic data between the RAN node 1014 or RAN node 1016 and the S-GW, and the S1-MME interface 1028, which is a signaling interface between the RAN node 1014 or RAN node 1016 and MMEs.

Figure 11:
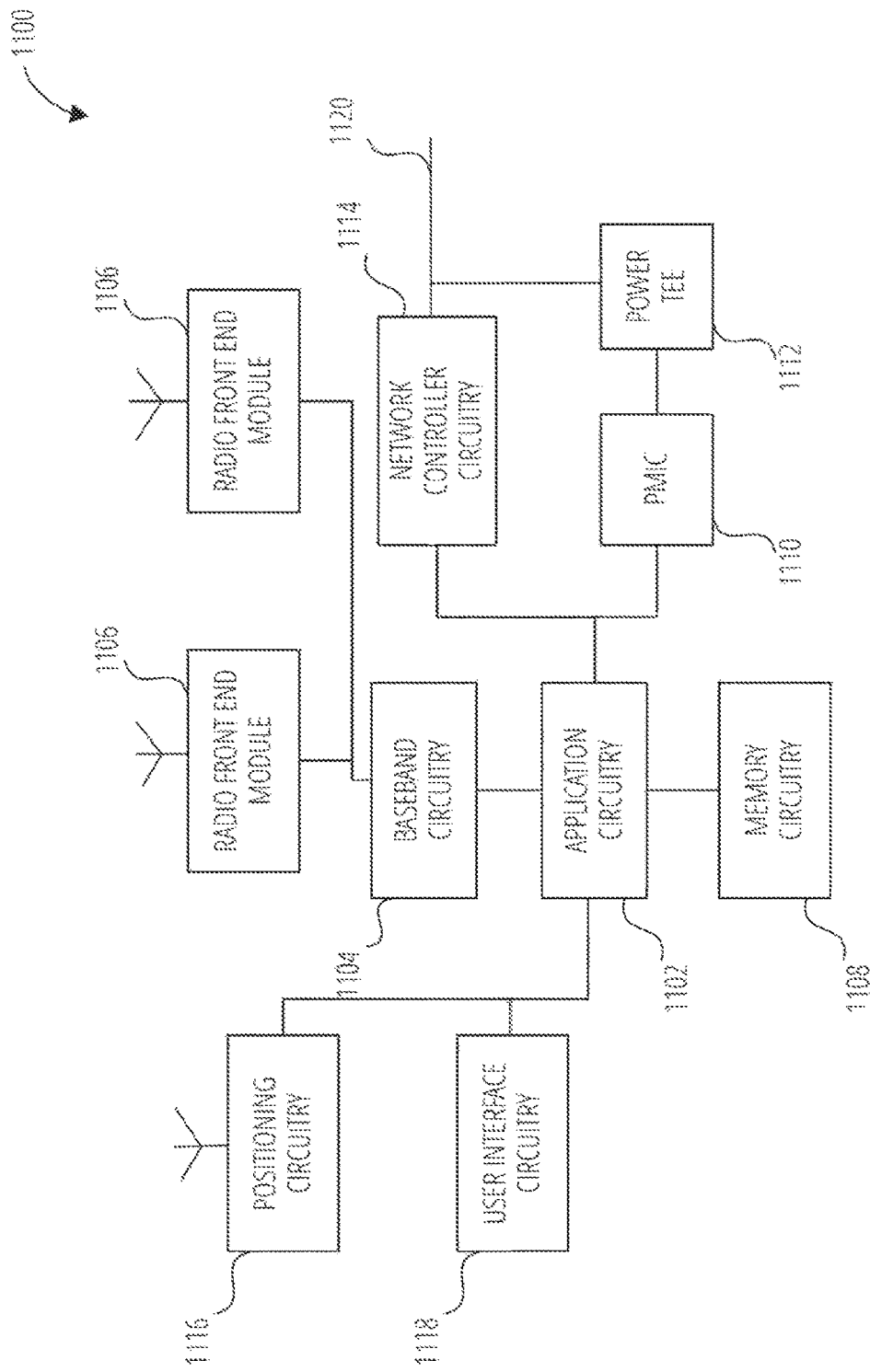
FIG. 11 illustrates an infrastructure equipment in accordance with one embodiment.

FIG. 11 illustrates an example of infrastructure equipment 1100 in accordance with various embodiments. The infrastructure equipment 1100 may be implemented as a base station, radio head, RAN node, AN, application server, and/or any other element/device discussed herein. In other examples, the infrastructure equipment 1100 could be implemented in or by a UE.

The infrastructure equipment 1100 includes application circuitry 1102, baseband circuitry 1104, one or more radio front end module 1106 (RFEM), memory circuitry 1108, power management integrated circuitry (shown as PMIC 1110), power tee circuitry 1112, network controller circuitry 1114, network interface connector 1120, satellite positioning circuitry 1116, and user interface circuitry 1118. In some embodiments, the device infrastructure equipment 1100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1102 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1102 may be coupled with or may include memory/storage elements and may be configured to execute instructions stored in the memory/storage to enable various applications or operating systems to run on the infrastructure equipment 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1102 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1102 may comprise, or may be, a special-purpose processor/controller to operate according to the various embodiments herein. As examples, the processor(s) of application circuitry 1102 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MfPS Warrior P-class processors; and/or the like. In some embodiments, the infrastructure equipment 1100 may not utilize application circuitry 1102, and instead may include a special-purpose processor/controller to process IP data received from an EPC or 5GC, for example.

In some implementations, the application circuitry 1102 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1102 may comprise logic blocks or logic fabric, and other interconnected resources that may be programmed to perform various functions, such as the procedures, methods, functions, etc. of the various embodiments discussed herein. In such embodiments, the circuitry of application circuitry 1102 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like, The baseband circuitry 1104 may be implemented, for example, as a solder-down substrate including one or more integrated circuits, a single packaged integrated circuit soldered to a main circuit board or a multi-chip module containing two or more integrated circuits.

The user interface circuitry 1118 may include one or more user interfaces designed to enable user interaction with the infrastructure equipment 1100 or peripheral component interfaces designed to enable peripheral component interaction with the infrastructure equipment 1100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1106 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1106, which incorporates both mmWave antennas and sub-mmWave.

The memory circuitry 1108 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1108 may be implemented as one or more of solder down packaged integrated circuits, socketed memory modules and plug-in memory cards.

The PMIC 1110 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1112 may provide for electrical power drawn from a network cable to provide both power supply and data connectivity to the infrastructure equipment 1100 using a single cable.

The network controller circuitry 1114 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1100 via network interface connector 1120 using a physical connection, which may be electrical (commonly referred to as a "copper interconnect"), optical, or wireless. The network controller circuitry 1114 may include one or more dedicated processors and/or FPGAs to communicate using one or more of the aforementioned protocols. In some implementations, the network controller circuitry 1114 may include multiple controllers to provide connectivity to other networks using the same or different protocols.

The positioning circuitry 1116 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1116 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1116 may include a Micro-Technology for Positioning, Navigation, and Timing (Micro-PNT) IC that uses a master timing clock to perform position tracking/estimation without GNSS assistance. The positioning circuitry 1116 may also be part of, or interact with, the baseband circuitry 1104 and/or radio front end module 1106 to communicate with the nodes and components of the positioning network. The positioning circuitry 1116 may also provide position data and/or time data to the application circuitry 1102, which may use the data to synchronize operations with various infrastructure, or the like. The components shown by FIG. 11 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 12:
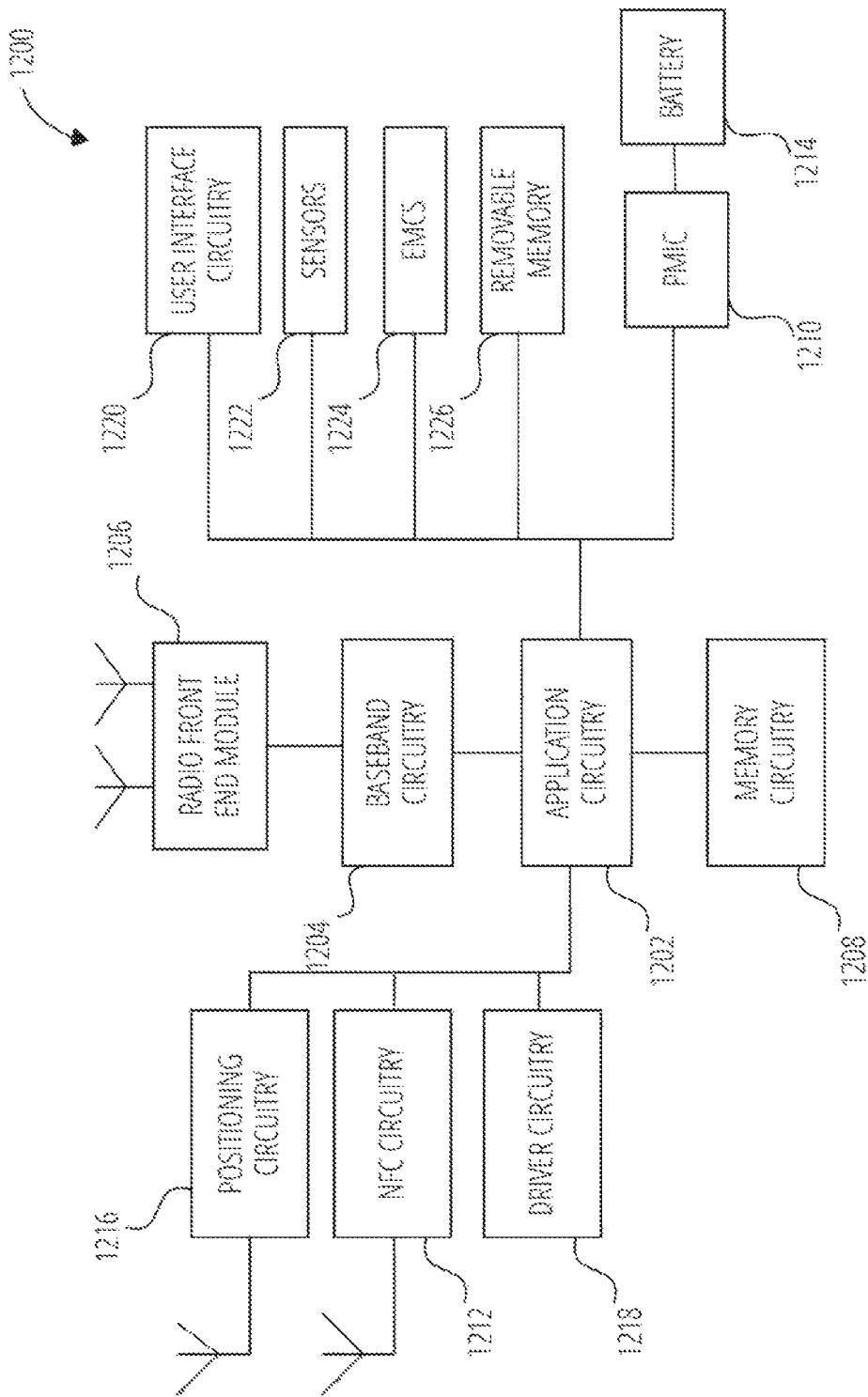
FIG. 12 illustrates a platform in accordance with one embodiment.

FIG. 12 illustrates an example of a platform 1200 in accordance with various embodiments. In embodiments, the computer platform 1200 may be suitable for use as UEs, application servers, and/or any other element/device discussed herein. The platform 1200 may include any combinations of the components shown in the example. The components of platform 1200 may be implemented as integrated circuits (ICs), portions thereof, discrete electronic devices, or other modules, logic, hardware, software, firmware, or a combination thereof adapted in the computer platform 1200, or as components otherwise incorporated within a chassis of a larger system. The block diagram of FIG. 12 is intended to show a high level view of components of the computer platform 1200. However, some of the components shown may be omitted, additional components may be present, and different arrangement of the components shown may occur in other implementations.

Application circuitry 1202 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1202 may be coupled with or may include memory/storage elements and may be configured to execute instructions stored in the memory/storage to enable various applications or operating systems to run on the platform 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1202 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1202 may comprise, or may be, a special-purpose processor/controller to operate according to the various embodiments herein.

As examples, the processor(s) of application circuitry 1202 may include an Intel® Architecture Core™ based processor, such as a Quark™, an Atom™, an i3, an i5, an i7, or an MCU-class processor, or another such processor available from Intel® Corporation. The processors of the application circuitry 1202 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1202 may be a part of a system on a chip (SoC) in which the application circuitry 1202 and other components are formed into a single integrated circuit, or a single package, such as the Edison™ or Galileo™ SoC boards from Intel® Corporation.

Additionally or alternatively, application circuitry 1202 may include circuitry such as, but not limited to, one or more a field-programmable devices (FPDs) such as FPGAs and the like; programmable logic devices(PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1202 may comprise logic blocks or logic fabric, and other interconnected resources that may be programmed to perform various functions, such as the procedures, methods, functions, etc. of the various embodiments discussed herein. In such embodiments, the circuitry of application circuitry 1202 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1204 may be implemented, for example, as a solder-down substrate including one or more integrated circuits, a single packaged integrated circuit soldered to a main circuit board or a multi-chip module containing two or more integrated circuits.

The radio front end module 1206 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-nunWave radio functions may be implemented in the same physical radio front end module 1206, which incorporates both mmWave antennas and sub-mmWave.

The memory circuitry 1208 may include any number and type of memory devices used to provide for a given amount of system memory. As examples, the memory circuitry 1208 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1208 may be developed in accordance with a Joint Electron Devices Engineering Council (JEDEC) low power double data rate (LPDDR)-based design, such as LPDDR2, LPDDR3, LPDDR4, or the like. Memory circuitry 1208 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1208 maybe on-die memory or registers associated with the application circuitry 1202. To provide for persistent storage of information such as data, applications, operating systems and so forth, memory circuitry 1208 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1200 may incorporate the three-dimensional (3D) cross-point (XPOINT) memories from Intel® and Micron®.

The removable memory 1226 may include devices, circuitry, enclosures/housings, ports or receptacles, etc. used to couple portable data storage devices with the platform 1200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1200 may also include interface circuitry (not shown) that is used to connect external devices with the platform 1200. The external devices connected to the platform 1200 via the interface circuitry include sensors 1222 and electro-mechanical components (shown as EMCs 1224), as well as removable memory devices coupled to removable memory 1226.

The sensors 1222 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1224 include devices, modules, or subsystems whose purpose is to enable platform 1200 to change its state, position, and/or orientation, or move or control a mechanism or (sub)system. Additionally, EMCs 1224 may be configured to generate and send messages/signaling to other components of the platform 1200 to indicate a current state of the EMCs 1224. Examples of the EMCs 1224 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1200 is configured to operate one or more EMCs 1224 based on one or more captured events and/or instructions or control signals received from a service provider and/or various clients. In some implementations, the interface circuitry may connect the platform 1200 with positioning circuitry 1216. The positioning circuitry 1216 includes circuitry to receive and decode signals transmitted/broadcasted by a. positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1216 comprises various hardware elements including hardware devices such as switches, filters, amplifiers, antenna elements, and the like to facilitate OTA communications) to communicate with components of a positioning network, such as navigation satellite constellation nodes. In some embodiments, the positioning circuitry 1216 may include a Micro-PNT IC that uses a master timing clock to perform position tracking/estimation without GNSS assistance. The positioning circuitry 1216 may also be part of, or interact with, the baseband circuitry 1204 and/or radio front end module 1206 to communicate with the nodes and components of the positioning network. The positioning circuitry 1216 may also provide position data and/or time data to the application circuitry 1202, which may use the data to synchronize operations with various infrastructure (e.g., radio base stations), for turn-by-turn navigation applications, or the like.

In some implementations, the interface circuitry may connect the platform 1200 with Near-Field Communication circuitry (shown as NFC circuitry 1212). The NFC circuitry 1212 is configured to provide contactless, short-range communications based on radio frequency identification (RFID) standards, wherein magnetic field induction is used to enable communication between NFC circuitry 1212 and NEC-enabled devices external to the platform 1200 (e.g., an "NFC touchpoint"). NFC circuitry 1212 comprises an NFC controller coupled with an antenna element and a processor coupled with the NFC controller. The NFC controller may be a chip/IC providing NFC functionalities to the NFC circuitry 1212 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1212, or initiate data transfer between the NFC circuitry 1212 and another active NFC device (e.g., a smartphone or an NFC-enabled POS terminal) that is proximate to the platform 1200.

The driver circuitry 1218 may include software and hardware elements that operate to control particular devices that are embedded in the platform 1200, attached to the platform 1200, or otherwise communicatively coupled with the platform 1200. The driver circuitry 1218 may include individual drivers allowing other components of the platform 1200 to interact with or control various input/output (I/O) devices that may be present within, or connected to, the platform 1200. For example, driver circuitry 1218 may include a display driver to control and allow access to a display device, a touchscreen driver to control and allow access to a touchscreen interface of the platform 1200, sensor drivers to obtain sensor readings of sensors 1222 and control and allow access to sensors 1222, EMC drivers to obtain actuator positions of the EMCs 1224 and/or control and allow access to the EMCs 1224, a camera driver to control and allow access to an embedded image capture device, audio drivers to control and allow access to one or more audio devices.

The power management integrated circuitry (shown as PMIC 1210) (also referred to as "power management circuitry") may manage power provided to various components of the platform 1200. In particular, with respect to the baseband circuitry 1204, the PMIC 1210 may control power-source selection, voltage scaling, battery charging, or DC-to-DC conversion. The PMIC 1210 may often be included when the platform 1200 is capable of being powered by a battery 1214, for example, when the device is included in a UE.

In some embodiments, the PMIC 1210 may control, or otherwise be part of, various power saving mechanisms of the platform 1200. For example, if the platform 1200 is in an RRC_Connected state, where it is still connected to the RAN node as it expects to receive traffic shortly, then it may enter a state known as Discontinuous Reception Mode (DRX) after a period of inactivity. During this state, the platform 1200 may power down for brief intervals of time and thus save power. If there is no data traffic activity for an extended period of time, then the platform 1200 may transition off to an RRC_Idle state, where it disconnects from the network and does not perform operations such as channel quality feedback, handover, etc. The platform 1200 goes into a very low power state and it performs paging where again it periodically wakes up to listen to the network and then powers down again. The platform 1200 may not receive data in this state in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1214 may power the platform 1200, although in some examples the platform 1200 may be mounted deployed in a fixed location, and may have a power supply coupled to an electrical grid. The battery 1214 may be a lithium ion battery, a metal-air battery, such as a zinc-air battery, an aluminum-air battery, a lithium-air battery, and the like. In some implementations, such as in V2X applications, the battery 1214 may be a typical lead-acid automotive battery.

In some implementations, the battery 1214 may be a "smart battery," which includes or is coupled with a Battery Management System (BMS) or battery monitoring integrated circuitry. The BMS may be included in the platform 1200 to track the state of charge (SoCh) of the battery 1214. The BMS may be used to monitor other parameters of the battery 1214 to provide failure predictions, such as the state of health (SoH) and the state of function (SoF) of the battery 1214. The BMS may communicate the information of the battery 1214 to the application circuitry 1202 or other components of the platform 1200. The BMS may also include an analog-to-digital (ADC) convertor that allows the application circuitry 1202 to directly monitor the voltage of the battery 1214 or the current flow from the battery 1214. The battery parameters may be used to determine actions that the platform 1200 may perform, such as transmission frequency, network operation, sensing frequency, and the like.

A power block, or other power supply coupled to an electrical grid may be coupled with the BMS to charge the battery 1214. In some examples, the power block may be replaced with a wireless power receiver to obtain the power wirelessly, for example, through a loop antenna in the computer platform 1200. In these examples, a wireless battery charging circuit may be included in the BMS. The specific charging circuits chosen may depend on the size of the battery 1214, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1220 includes various input/output (I/O) devices present within, or connected to, the platform 1200, and includes one or more user interfaces designed to enable user interaction with the platform 1200 and/or peripheral component interfaces designed to enable peripheral component interaction with the platform 1200. The user interface circuitry 1220 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1200. The output device circuitry may also include speakers or other audio emitting devices, printer(s), and/or the like. In some embodiments, the sensors 1222 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1200 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 13:
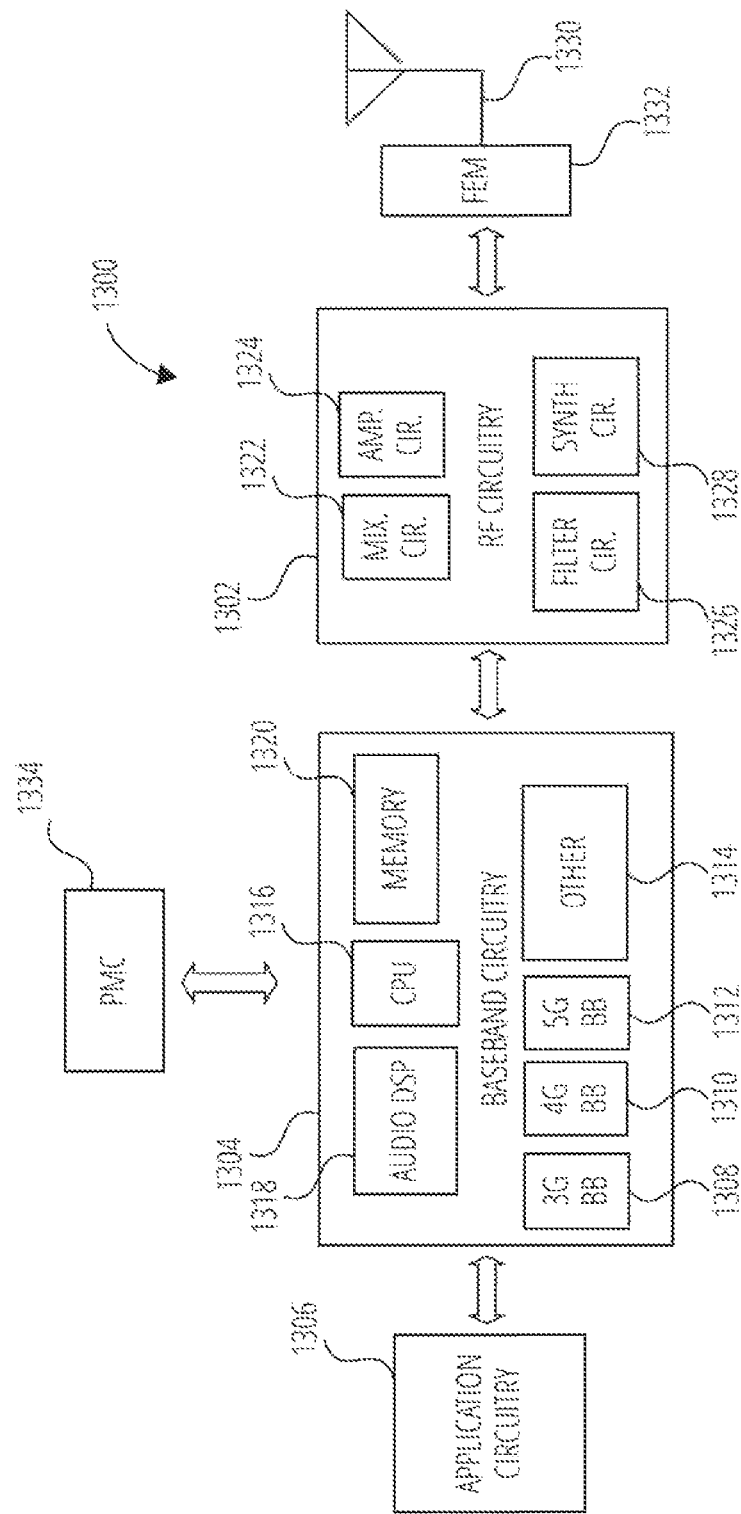
FIG. 13 illustrates a device in accordance with one embodiment.

FIG. 13 illustrates example components of a device 1300 in accordance with some embodiments. In some embodiments, the device 1300 may include application circuitry 1306, baseband circuitry 1304, Radio Frequency (RF) circuitry (shown as RF circuitry 1302), front-end module (FEM) circuitry (shown as FEM circuitry 1332), one or more antennas 1330, and power management circuitry (PMC) (shown as PMC 1334) coupled together at least as shown. The components of the illustrated device 1300 may be included in a UE or a RAN node sonic embodiments, the device 1300 may include fewer elements (e.g., a RAN node may not utilize application circuitry 1306, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1306 may include one or more application processors. For example, the application circuitry 1306 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/ storage to enable various applications or operating systems to run on the device 1300. In some embodiments, processors of application circuitry 1306 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1302 and to generate baseband signals for a transmit signal path of the RF circuitry 1302. The baseband circuitry 1304 may interface with the application circuitry 1306 for generation and processing of the baseband signals and for controlling operations of the RF circuitry 1302. For example, in some embodiments, the baseband circuitry 1304 may include a third generation (3G) baseband processor (3G baseband processor 1308), a fourth generation (4G) baseband processor (4G baseband processor 1310), a fifth generation (5G) baseband processor (5G baseband processor 1312), or other baseband processor(s) 1314 for other existing generations, generations in development or to be developed in the future (e.g., second generation (2G), sixth generation (6G), etc). The baseband circuitry 1304 (e.g., one or more of baseband processors) may handle various radio control functions that enable communication with one or more radio networks via the RF circuitry 1302. In other embodiments, some or all of the functionality of the illustrated baseband processors may be included in modules stored in the memory 1320 and executed via a Central Processing Unit (CPU 1316). The radio control functions may include, but are not limited to, signal modulation/demodulation, encoding/decoding, radio frequency shifting, etc. In sonic embodiments, modulation/demodulation circuitry of the baseband circuitry 1304 may include Fast-Fourier Transform (FFT), preceding, or constellation mapping/demapping functionality. In some embodiments, encoding/decoding circuitry of the baseband circuitry 1304 may include convolution, tail-biting convolution, turbo, Viterbi, or Low Density Parity Check (LDDC) encoder/decoder functionality. Embodiments of modulation/demodulation and encoder/decoder functionality are not limited to these examples and may include other suitable functionality in other embodiments.

In some embodiments, the baseband circuitry 1304 may include a digital signal processor (DSP), such as one or more audio DSP(s) 1318. The one or more audio DSP(s) 1318 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1306 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1304 is configured to support radio communications of more than one wireless protocol may be referred to as multi-mode baseband circuitry.

The RF circuitry 1302 may enable communication with wireless networks using modulated electromagnetic radiation through a non-solid medium. In various embodiments, the RF circuitry 1302 may include switches, filters, amplifiers, etc. to facilitate the communication with the wireless network. The RF circuitry 1302 may include a receive signal path which may include circuitry to down-convert RF signals received from the FEM circuitry 1332 and provide baseband signals to the baseband circuitry 1304. The RF circuitry 1302 may also include a transmit signal path which may include circuitry to up-convert baseband signals provided by the baseband circuitry 1304 and provide RF output signals to the FEM circuitry 1332 for transmission.

In some embodiments, the receive signal path of the RF circuitry 1302 may include mixer circuitry 1322, amplifier circuitry 1324 and filter circuitry 1326. In some embodiments, the transmit signal path of the RF circuitry 1302 may include filter circuitry 1326 and mixer circuitry 1322. The RF circuitry 1302 may also include synthesizer circuitry 1328 for synthesizing a frequency for use by the mixer circuitry 1322 of the receive signal path and the transmit signal path. In some embodiments, the mixer circuitry 1322 of the receive signal path may be configured to down-convert RF signals received from the FEM circuitry 1332 based on the synthesized frequency provided by synthesizer circuitry 1328. The amplifier circuitry 1324 may be configured to amplify the down-converted signals and the filter circuitry 1326 may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, the mixer circuitry 1322 of the receive signal path may comprise passive mixers, although the scope of the embodiments is not limited in this respect.

In some embodiments, the mixer circuitry 1322 of the transmit signal path may be configured to up-convert input baseband signals based on the synthesized frequency provided by the synthesizer circuitry 1328 to generate RF output signals for the FEM circuitry 1332. The baseband signals may be provided by the baseband circuitry 1304 and may be filtered by the filter circuitry 1326.

In some embodiments, the mixer circuitry 1322 of the receive signal path and the mixer circuitry 1322 of the transmit signal path may include two or more mixers and may be arranged for quadrature downconversion and upconversion, respectively. In some embodiments, the mixer circuitry 1322 of the receive signal path and the mixer circuitry 1322 of the transmit signal path may include two or more mixers and may be arranged for image rejection (e.g., Hartley image rejection). In some embodiments, the mixer circuitry 1322 of the receive signal path and the mixer circuitry 1322 may be arranged for direct downconversion and direct upconversion, respectively. In some embodiments, the mixer circuitry 1322 of the receive signal path and the mixer circuitry 1322 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1302 may include analog-to-digital converter (ADC) and digital-to-analog converter (DAC) circuitry and the baseband circuitry 1304 may include a digital baseband interface to communicate with the RF circuitry 1302.

In some dual-mode embodiments, a separate radio IC circuitry may be provided for processing signals for each spectrum, although the scope of the embodiments is not limited in this respect.

In some embodiments, the synthesizer circuitry 1328 may be a fractional-N synthesizer or a fractional N/N+1 synthesizer, although the scope of the embodiments is not limited in this respect as other types of frequency synthesizers may be suitable. For example, synthesizer circuitry 1328 may be a delta-sigma synthesizer, a frequency multiplier, or a synthesizer comprising a phase-locked loop with a frequency divider.

The synthesizer circuitry 1328 may be configured to synthesize an output frequency for use by the mixer circuitry 1322 of the RF circuitry 1302 based on a frequency input and a divider control input. In some embodiments, the synthesizer circuitry 1328 may be a fractional N/N+1 synthesizer.

In some embodiments, frequency input may be provided by a voltage controlled oscillator (VCO), although that is not a requirement. Divider control input may be provided by either the baseband circuitry 1304 or the application circuitry 1306 (such as an applications processor) depending on the desired output frequency. In some embodiments, a divider control input (e.g., N) may be determined from a look-up table based on a channel indicated by the application circuitry 1306.

Synthesizer circuitry 1328 of the RF circuitry 1302 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1328 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1302 may include an IQ/polar converter.

The FEM circuitry 1332 may include a receive signal path which may include circuitry configured to operate on RF signals received from one or more antennas 1330, amplify the received signals and provide the amplified versions of the received signals to the RE circuitry 1302 for further processing. The FEM circuitry 1332 may also include a transmit signal path which may include circuitry configured to amplify signals for transmission provided by the RF circuitry 1302 for transmission by one or more of the one or more antennas 1330. In various embodiments, the amplification through the transmit or receive signal paths may be done solely in the RE circuitry 1302, solely in the FEM circuitry 1332, or in both the RF circuitry 1302 and the FEM circuitry 1332.

In some embodiments, the FEM circuitry 1332 may include a TX/RX switch to switch between transmit mode and receive mode operation. The FEM circuitry 1332 may include a receive signal path and a transmit signal path. The receive signal path of the FEM circuitry 1332 may include an LNA to amplify received RF signals and provide the amplified received RF signals as an output (e.g., to the RF circuitry 1302). The transmit signal path of the FEM circuitry 1332 may include a power amplifier (PA) to amplify input RF signals (e.g., provided by the RF circuitry 1302), and one or more filters to generate RF signals for subsequent transmission (e.g., by one or more of the one or more antennas 1330).

In some embodiments, the PMC 1334 may manage power provided to the baseband circuitry 1304. In particular, the PMC 1334 may control power-source selection, voltage scaling, battery charging, or DC-to-DC conversion. The PMC 1334 may often be included when the device 1300 is capable of being powered by a battery, for example, when the device 1300 is included in a UE. The PMC 1334 may increase the power conversion efficiency while providing desirable implementation size and heat dissipation characteristics.

FIG. 13 shows the PMC 1334 coupled only with the baseband circuitry 1304. However, in other embodiments, the PMC 1334 may be additionally or alternatively coupled with, and perform similar power management operations for, other components such as, but not limited to, the application circuitry 1306, the RF circuitry 1302, or the FEM circuitry 1332.

In some embodiments, the PMC 1334 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1306 and processors of the baseband circuitry 1304 may be used to execute elements of one or more instances of a protocol stack. For example, processors of the baseband circuitry 1304, alone or in combination, may be used to execute Layer 3, Layer 2, or Layer 1 functionality, while processors of the application circuitry 1306 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
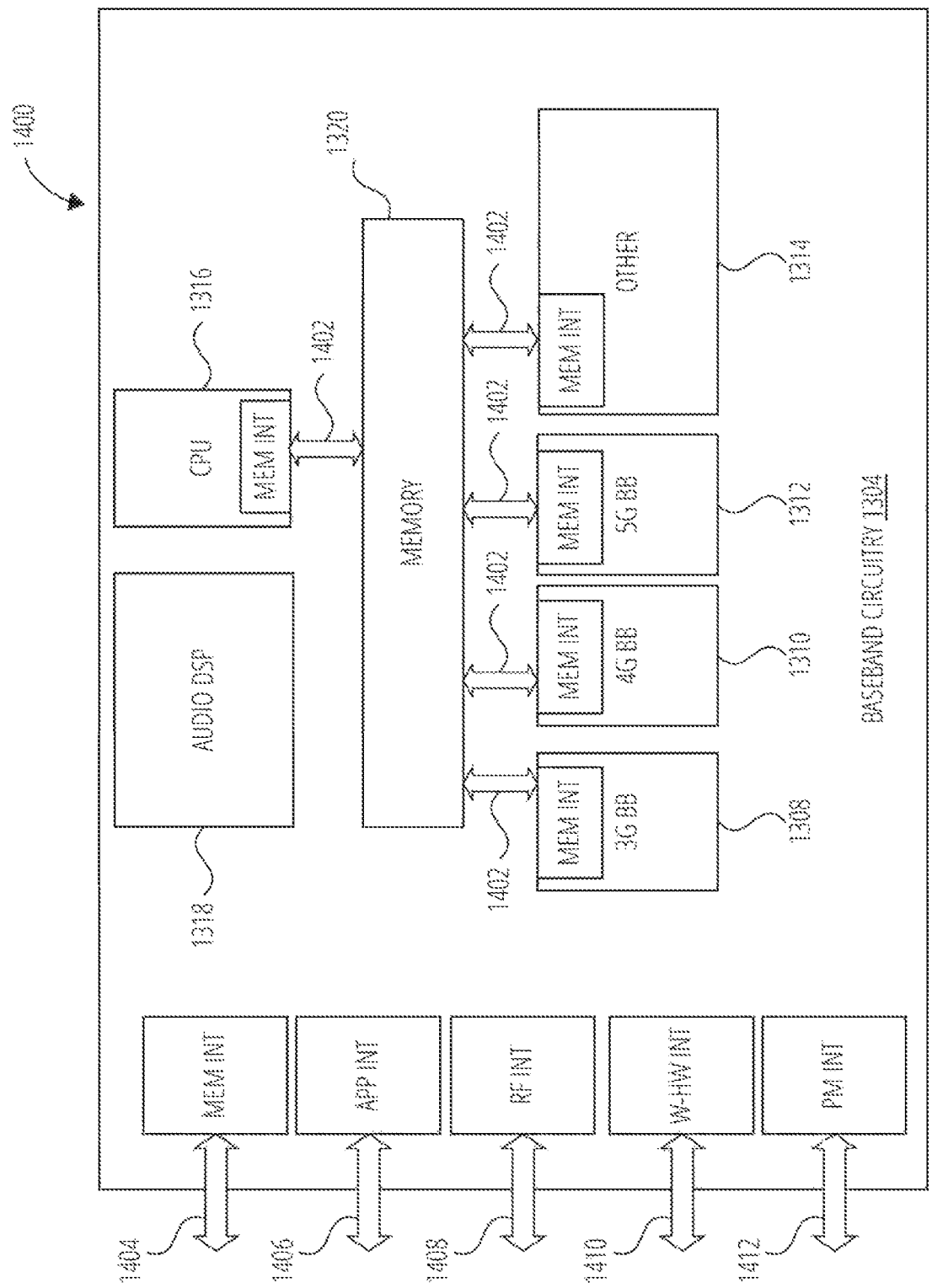
FIG. 14 illustrates example interfaces in accordance with one embodiment.

FIG. 14 illustrates example interfaces 1400 of baseband circuitry in accordance with some embodiments. As discussed above, the baseband circuitry 1304 of FIG. 13 may comprise 3G baseband processor 1308, 4G baseband processor 1310, 5G baseband processor 1312, other baseband processor(s) 1314, CPU 1316, and a memory 1320 utilized by said processors. As illustrated, each of the processors may include a respective memory interface 1402 to send/receive data to/from the memory 1320.

The baseband circuitry 1304 may further include one or more interfaces to communicatively couple to other circuitries/devices, such as a memory interface 1404 (e.g., an interface to send/receive data to/from memory external to the baseband circuitry 1304), an application circuitry interface 1406 (e.g., an interface to send/receive data to/from the application circuitry 1306 of FIG. 13), an RF circuitry interface 1408 (e.g., an interface to send/receive data to/from RF circuitry 1302 of FIG. 13), a wireless hardware connectivity interface 1410 (e.g., an interface to send/receive data to/from Near Field Communication (NFC) components, Bluetooth® components (e.g., Bluetooth® Low Energy), Wi-Fi® components, and other communication components), and a power management interface 1412 (e.g., an interface to send/receive power or control signals to/from the PMC 1334.

Figure 15:
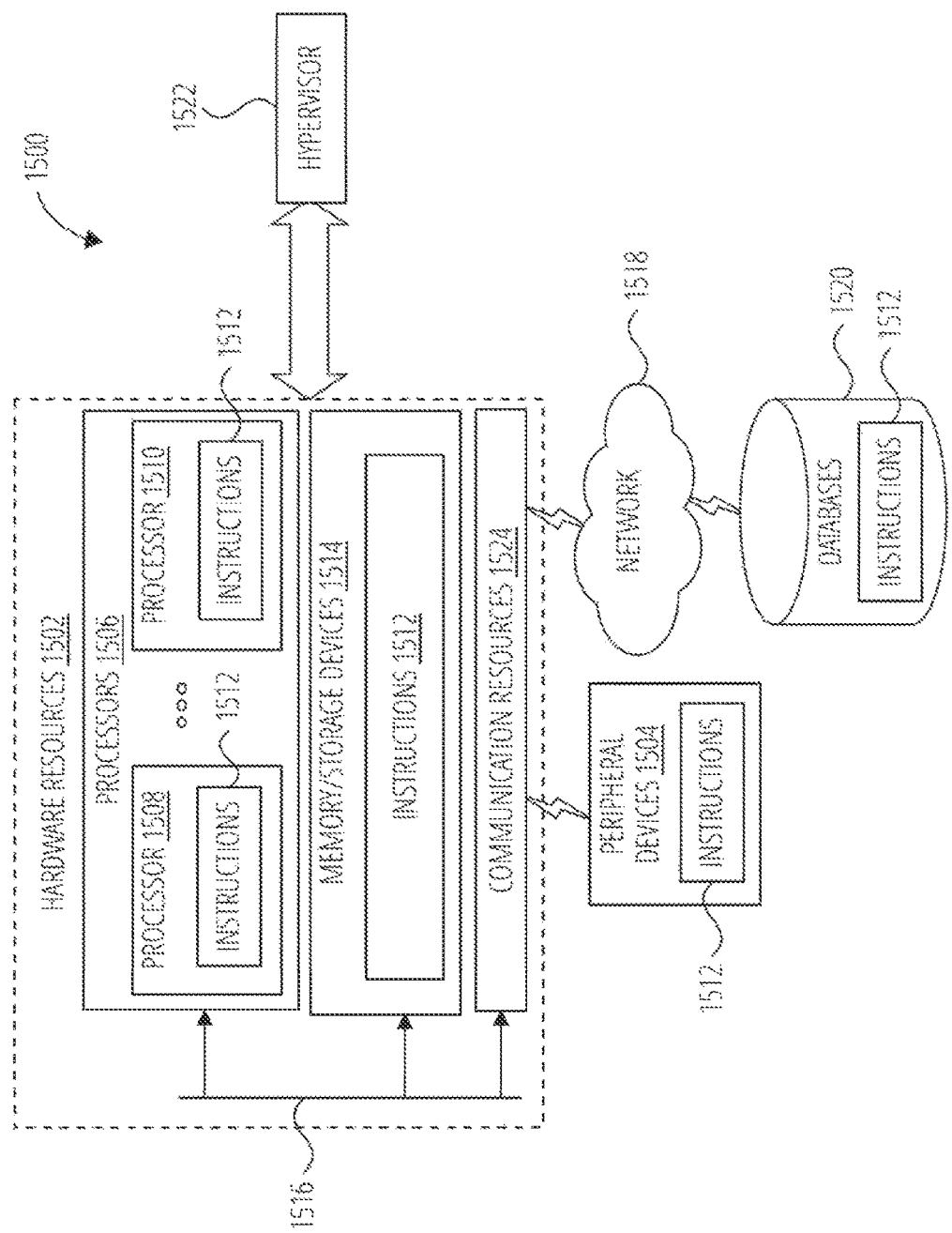
FIG. 15 illustrates components in accordance with one embodiment.

FIG. 15 is a block diagram illustrating components 1500, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1502 including one or more processors 1506 (or processor cores), one or more memory/storage devices 1514, and one or more communication resources 1524, each of which may be communicatively coupled via a bus 1516. For embodiments where node virtualization (e.g., NFV) is utilized, a hypervisor 1522 may be executed to provide an execution environment for one or more network slices/sub-slices to utilize the hardware resources 1502.

The processors 1506 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1508 and a processor 1510.

The memory/storage devices 1514 may include main memory, disk storage, or any suitable combination thereof. The memory/storage devices 1514 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1524 may include interconnection or network interface components or other suitable devices to communicate with one or more peripheral devices 1504 or one or more databases 1520 via a network 1518. For example, the communication resources 1524 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1512 may comprise software, a program, an application, an applet, an app, or other executable code for causing at least any of the processors 1506 to perform any one or more of the methodologies discussed herein. The instructions 1512 may reside, completely or partially, within at least one of the processors 1506 (e.g., within the processor's cache memory), the memory/storage devices 1514, or any suitable combination thereof. Furthermore, any portion of the instructions 1512 may be transferred to the hardware resources 1502 from any combination of the peripheral devices 1504 or the databases 1520. Accordingly, the memory of the processors 1506, the memory/storage devices 1514, the peripheral devices 1504, and the databases 1520 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 may include a method for wireless communications by an access and mobility management function (AMF), comprising: processing group information associated with a multicast/broadcast (MB) session context received from an application function (AF), at least a portion of the group information comprising a temporary mobile group identity (TMGI); processing a plurality of MB session join requests received from a plurality of user equipment (UEs), each of the plurality of MB session join requests including the TMGI and being associated with the MB session context; in response to processing the plurality of UE MB session join requests, encoding an MB session request associated with the MB session context for transmission to an MB-session management function (MB-SMF); processing an MB session response associated with the MB session context received from the MB-SMF, the MB session response including a key derived for each of a portion of the plurality of UEs using a UE ID associated with each of the plurality of UEs and the TMGI; and encoding a downlink (DL) non-access stratum (NAS) message for transmitting to each of the plurality of UEs and an N2 message for transmitting to a base station, both the DL NAS message and the N2 message including the derived key.

Example 2 may include the method of example 1, wherein each derived key is delivered to the portion of the plurality of UEs via point-to-multipoint (PTM) delivery, each derived key being identical for each of the portion of the plurality of UEs.

Example 3 may include the method of example 2, wherein one or more NAS keys are reused and delivered to a second, different portion of the plurality of UEs via point-to-point (PTP) delivery.

Example 4 may include the method of example 3, wherein the derived key and the NAS keys are different.

Example 5 may include the method of example 1, wherein the UE ID is unique for each of the portion of UEs and comprises one of a subscription permanent identifier (SUPI) or a generic public subscription identifier (GPSI).

Example 6 may include the method of example 1, wherein the derived key is configured to allow the base station to encrypt MBS packets for transmission and the portion of UEs to decrypt the encrypted MBS packets.

Example 7 may include the method of example 1, wherein the derived key utilizes symmetric cryptography.

Example 8 may include a method for wireless communications by an access and mobility management function (AMF), comprising: processing group information associated with a multicast/broadcast (MB) session context received from an application function (AF), at least a portion of the group information comprising a temporary mobile group identity (TMGI); processing a plurality of MB session join requests received from a plurality of user equipment (UEs), each of the plurality of MB session join requests including the TMGI and being associated with the MB session context; in response to processing the plurality of UE MB session join requests, encoding an MB session request associated with the MB session context for transmission to an MB-session management function (MB-SMF); processing an MB session response associated with the MB session context received from the MB-SMF, the MB session response including a first set of keys derived for each of a first portion of the plurality of UEs using a UE ID associated with each of the first portion of UEs and the TMGI and a second set of keys derived for each of a second, different portion of the plurality of UEs using the UE ID associated with each of the second portion of UEs and the TMGI; and encoding a downlink (DL) non-access stratum (NAS) message for transmitting to each of the plurality of UEs and an N2 message for transmitting to a base station, each encoded DL NAS including a key from the first set of keys or the second set of keys and the N2 message including a key from the first set of keys or the second set of keys.

Example 9 may include the method of example 8, wherein the second set of keys are delivered to the second portion of UEs via point-to-multipoint (PTM) delivery and each of the second set of keys is identical.

Example 10 may include the method of example 9, wherein the first set of keys are delivered to the first portion of UEs via point-to-point (PTP) delivery and each of the first set of keys is uniquely associated with one of the first portion of UEs.

Example 11 may include the method of example 10, wherein the first set of keys are different than the second set of keys.

Example 12 may include the method of example 9, wherein the first set of keys are delivered to the first portion of UEs via point-to-point (PTP) delivery and each of the first set of keys is identical.

Example 13 may include the method of example 8, wherein the UE ID is unique for each of the plurality of UEs and comprises one of a subscription permanent identifier (SUPI) or a generic public subscription identifier (GPSI).

Example 14 may include the method of example 8, wherein each of the first set of keys and each of the second set of keys is configured to allow the base station to encrypt MBS packets for transmission and a corresponding UE of the plurality of UEs to decrypt the encrypted MBS packets.

Example 15 may include the method of example 8, wherein at least a portion of the first set of keys or the second set of keys utilizes asymmetric cryptography.

Example 16 may include a method for wireless communications by an access and mobility management function (AMF), comprising: processing group information associated with a multicast/broadcast (MB) session context received from an application function (AF), at least a portion of the group information comprising a temporary mobile group identity (TMGI); processing a plurality of MB session join requests received from a plurality of user equipment (UEs), each of the plurality of MB session join requests including the TMGI and being associated with the MB session context; in response to processing the plurality of UE MB session join requests, encoding an MB session request associated with the MB session context for transmission to an MB-session management function (MB-SMF); processing an MB session response associated with the MB session context received from the MB-SMF, the MB session response including a key derived for each of the plurality of UEs using a UE ID associated with each of the plurality of UEs and the TMGI, each derived key to be delivered by point-to-point (PTP) delivery or point-to-multipoint (PTM) delivery, wherein each derived key to be delivered by PTP is identical to each derived key to be delivered by PTM; and encoding a downlink (DL) non-access stratum (NAS) message for transmitting to each of the plurality of UEs and an N2 message for transmitting to a base station, both the DL NAS message and the N2 message including the derived key.

Example 17 may include the method of example 16, wherein the UE ID is unique for each of the plurality of UEs and comprises one of a subscription permanent identifier (SUPI) or a generic public subscription identifier (GPSI).

Example 18 may include the method of example 16, wherein the derived key is configured to allow the base station to encrypt MBS packets for transmission and the plurality of UEs to decrypt the encrypted MBS packets.

Example 19 may include the method of example 16, wherein the derived key utilizes symmetric cryptography.

Example 20 may include an apparatus for an access and mobility management function (AMF), comprising means for processing each of the steps in any of the claims 1 to 20.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein, It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for wireless communications by an access and mobility management function (AMF), comprising:

processing group information associated with a multicast/broadcast (MB) session context received from an application function (AF), at least a portion of the group information comprising a temporary mobile group identity (TMGI);

processing a plurality of MB session join requests received from a plurality of user equipment (UEs), each of the plurality of MB session join requests including the TMGI and being associated with the MB session context;

in response to processing the plurality of UE MB session join requests, encoding an MB session request associated with the MB session context for transmission to an MB-session management function (MB-SMF);

processing an MB session response associated with the MB session context received from the MB-SMF, the MB session response including a key derived for each of a portion of the plurality of UEs using a UE ID associated with each of the plurality of UEs and the TMGI; and encoding a downlink (DL) non-access stratum (NAS) message for transmitting to each of the plurality of UEs and an N2 message for transmitting to a base station, both the DL NAS message and the N2 message including the derived key.

2. The method of claim 1, wherein each derived key is delivered to the portion of the plurality of UEs via point-to-multipoint (PTM) delivery, each derived key being identical for each of the portion of the plurality of UEs.

3. The method of claim 2, wherein one or more NAS keys are reused and delivered to a second, different portion of the plurality of UEs via point-to-point (PTP) delivery.

4. The method of claim 3, wherein the derived key and the NAS keys are different.

5. The method of claim 1, wherein the UE ID is unique for each of the portion of UEs and comprises one of a subscription permanent identifier (SUPI) or a generic public subscription identifier (GPSI).

6. The method of claim 1, wherein the derived key is configured to allow the base station to encrypt MBS packets for transmission and the portion of UEs to decrypt the encrypted MBS packets.

7. The method of claim 1, wherein the derived key utilizes symmetric cryptography.

8. A method for wireless communications by an access and mobility management function (AMF), comprising:
processing group information associated with a multicast/broadcast (MB) session context received from an application function (AF), at least a portion of the group information comprising a temporary mobile group identity (TMGI);
processing a plurality of MB session join requests received from a plurality of user equipment (UEs), each of the plurality of MB session join requests including the TMGI and being associated with the MB session context;
in response to processing the plurality of UE MB session join requests, encoding an MB session request associated with the MB session context for transmission to an MB-session management function (MB-SMF);
processing an MB session response associated with the MB session context received from the MB-SMF, the MB session response including a first set of keys derived for each of a first portion of the plurality of UEs using a UE ID associated with each of the first portion of UEs and the TMGI and a second set of keys derived for each of a second, different portion of the plurality of UEs using the UE ID associated with each of the second portion of UEs and the TMGI; and
encoding a downlink (DL) non-access stratum (NAS) message for transmitting to each of the plurality of UEs and an N2 message for transmitting to a base station, each encoded DL NAS including a key from the first set of keys or the second set of keys and the N2 message including a key from the first set of keys or the second set of keys.

9. The method of claim 8, wherein the second set of keys are delivered to the second portion of UEs via point-to-multipoint (PTM) delivery and each of the second set of keys is identical.

10. The method of claim 9, wherein the first set of keys are delivered to the first portion of UEs via point-to-point (PTP) delivery and each of the first set of keys is uniquely associated with one of the first portion of UEs.

11. The method of claim 10, wherein the first set of keys are different than the second set of keys.

12. The method of claim 9, wherein the first set of keys are delivered to the first portion of UEs via point-to-point (PTP) delivery and each of the first set of keys is identical.

13. The method of claim 8, wherein the UE ID is unique for each of the plurality of UEs and comprises one of a subscription permanent identifier (SUPI) or a generic public subscription identifier (GPSI).

14. The method of claim 8, wherein each of the first set of keys and each of the second set of keys is configured to allow the base station to encrypt MBS packets for transmission and a corresponding UE of the plurality of UEs to decrypt the encrypted MBS packets.

15. The method of claim 8, wherein at least a portion of the first set of keys or the second set of keys utilizes asymmetric cryptography.

16. A method for wireless communications by an access and mobility management function (AMF), comprising:
processing group information associated with a multicast/broadcast (MB) session context received from an application function (AF), at least a portion of the group information comprising a temporary mobile group identity (TMGI);
processing a plurality of MB session join requests received from a plurality of user equipment (UEs), each of the plurality of MB session join requests including the TMGI and being associated with the MB session context;
in response to processing the plurality of UE MB session join requests, encoding an MB session request associated with the MB session context for transmission to an MB-session management function (MB-SMF);
processing an MB session response associated with the MB session context received from the MB-SMF, the MB session response including a key derived for each of the plurality of UEs using a UE ID associated with each of the plurality of UEs and the TMGI, each derived key to be delivered by point-to-point (PTP) delivery or point-to-multipoint (PTM) delivery, wherein each derived key to be delivered by PTP is identical to each derived key to be delivered by PTM; and
encoding a downlink (DL) non-access stratum (NAS) message for transmitting to each of the plurality of UEs and an N2 message for transmitting to a base station, both the DL NAS message and the N2 message including the derived key.

17. The method of claim 16, wherein the UE ID is unique for each of the plurality of UEs and comprises one of a subscription permanent identifier (SUPI) or a generic public subscription identifier (GPSI).

18. The method of claim 16, wherein the derived key is configured to allow the base station to encrypt MBS packets for transmission and the plurality of UEs to decrypt the encrypted MBS packets.

19. The method of claim 16, wherein the derived key utilizes symmetric cryptography.

* * * * *